No. 621,025. Patented Mar. 14, 1899.
G. A. BRACHHAUSEN.
AUTOMATIC MECHANICAL MUSICAL INSTRUMENT.
(Application filed Apr. 25, 1898.)
(No Model.) 13 Sheets—Sheet 1.
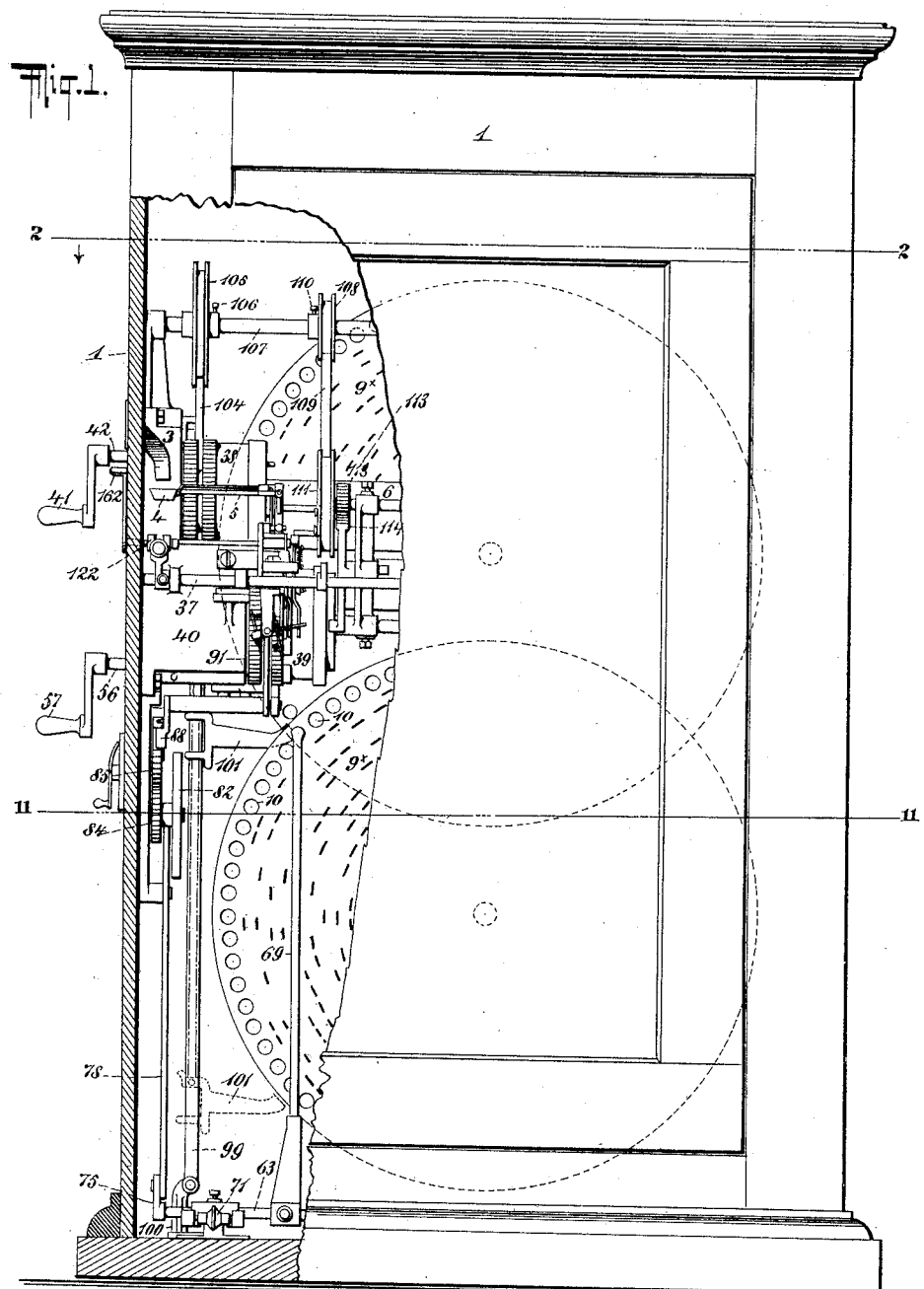

No. 621,025. Patented Mar. 14, 1899.
G. A. BRACHHAUSEN.
AUTOMATIC MECHANICAL MUSICAL INSTRUMENT.
(Application filed Apr. 25, 1898.)
(No Model.) 13 Sheets—Sheet 2.
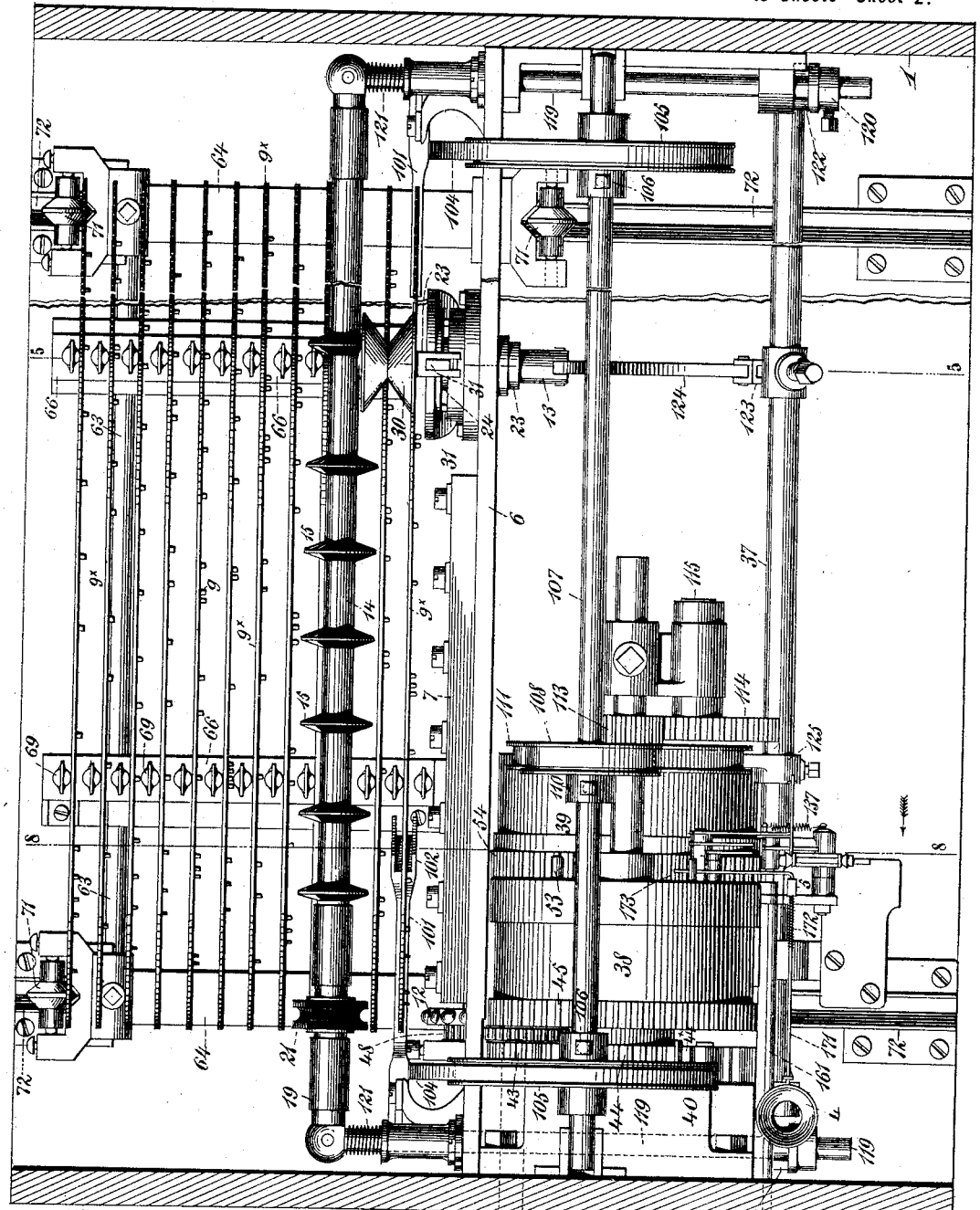
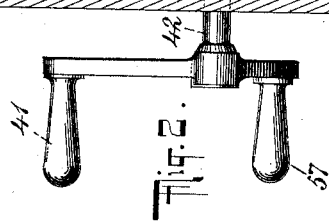
WITNESSES: INVENTOR
Gustav A. Brachhausen
BY
ATTORNEYS No. 621,025. Patented Mar. 14, 1899.
G. A. BRACHHAUSEN.
AUTOMATIC MECHANICAL MUSICAL INSTRUMENT.
(Application filed Apr. 25, 1898.)
(No Model.) 13 Sheets—Sheet 3.
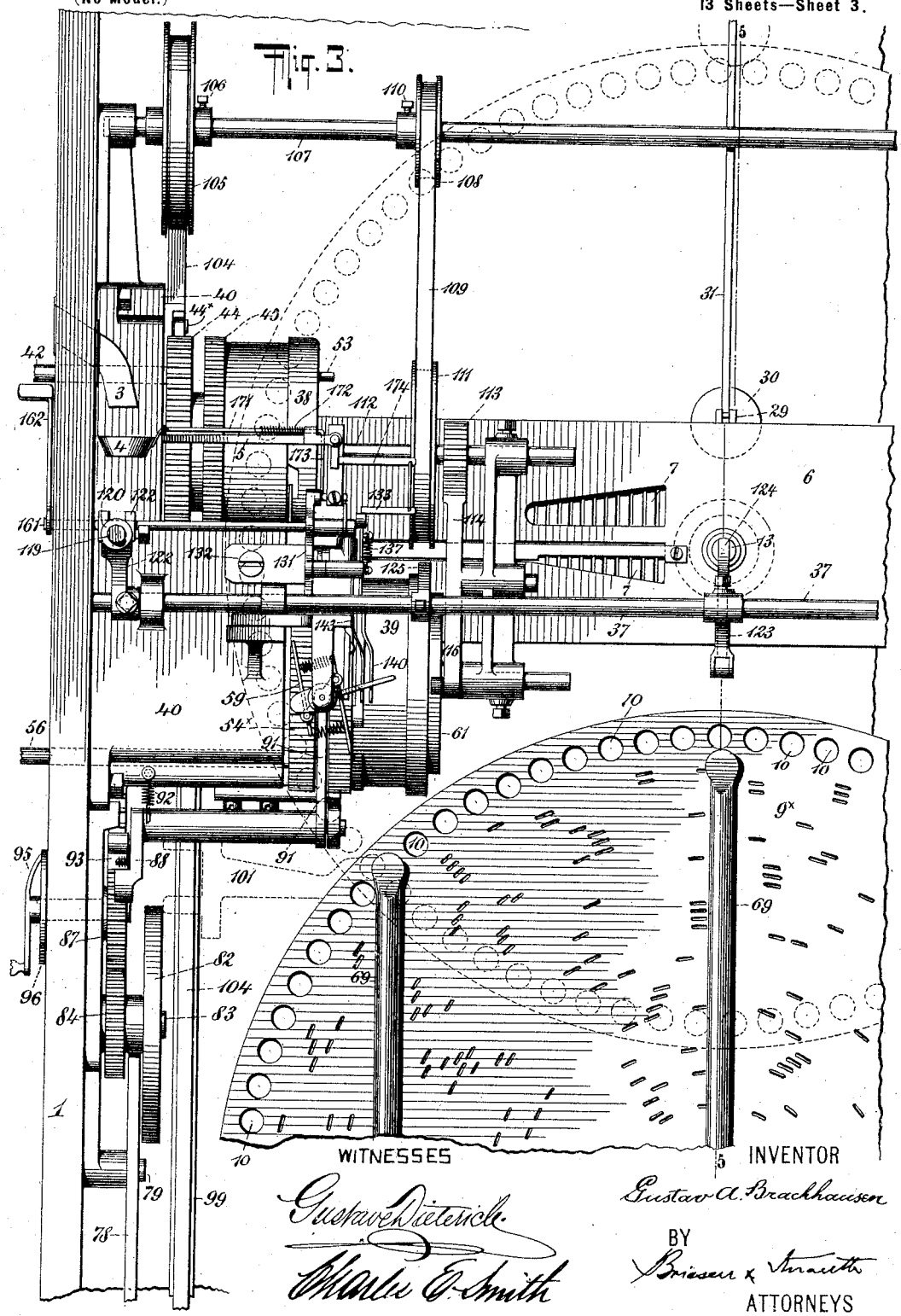
WITNESSES
INVENTOR
Gustav A. Brachhausen
BY
ATTORNEYS No. 621,025. Patented Mar. 14, 1899.
G. A. BRACHHAUSEN.
AUTOMATIC MECHANICAL MUSICAL INSTRUMENT.
(Application filed Apr. 25, 1898.)
(No Model.) 13 Sheets—Sheet 4.
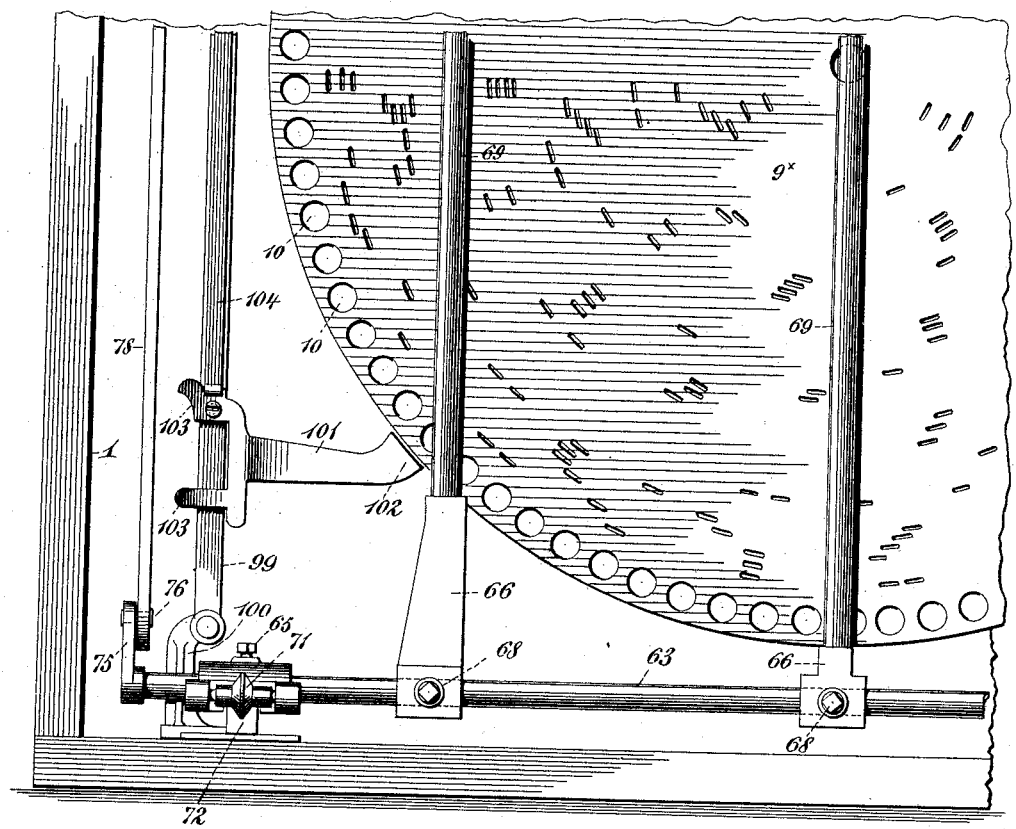
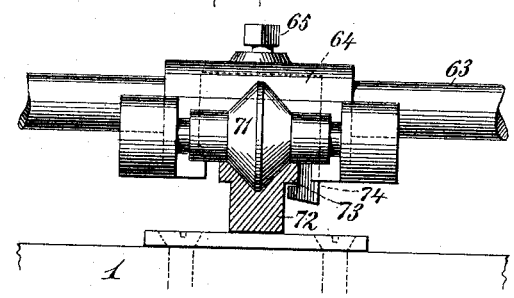
WITNESSES:
INVENTOR
Gustav A. Brachhausen
BY
ATTORNEYS No. 621,025. Patented Mar. 14, 1899.
G. A. BRACHHAUSEN.
AUTOMATIC MECHANICAL MUSICAL INSTRUMENT.
(Application filed Apr. 25, 1898.)
(No Model.) 13 Sheets—Sheet 5.
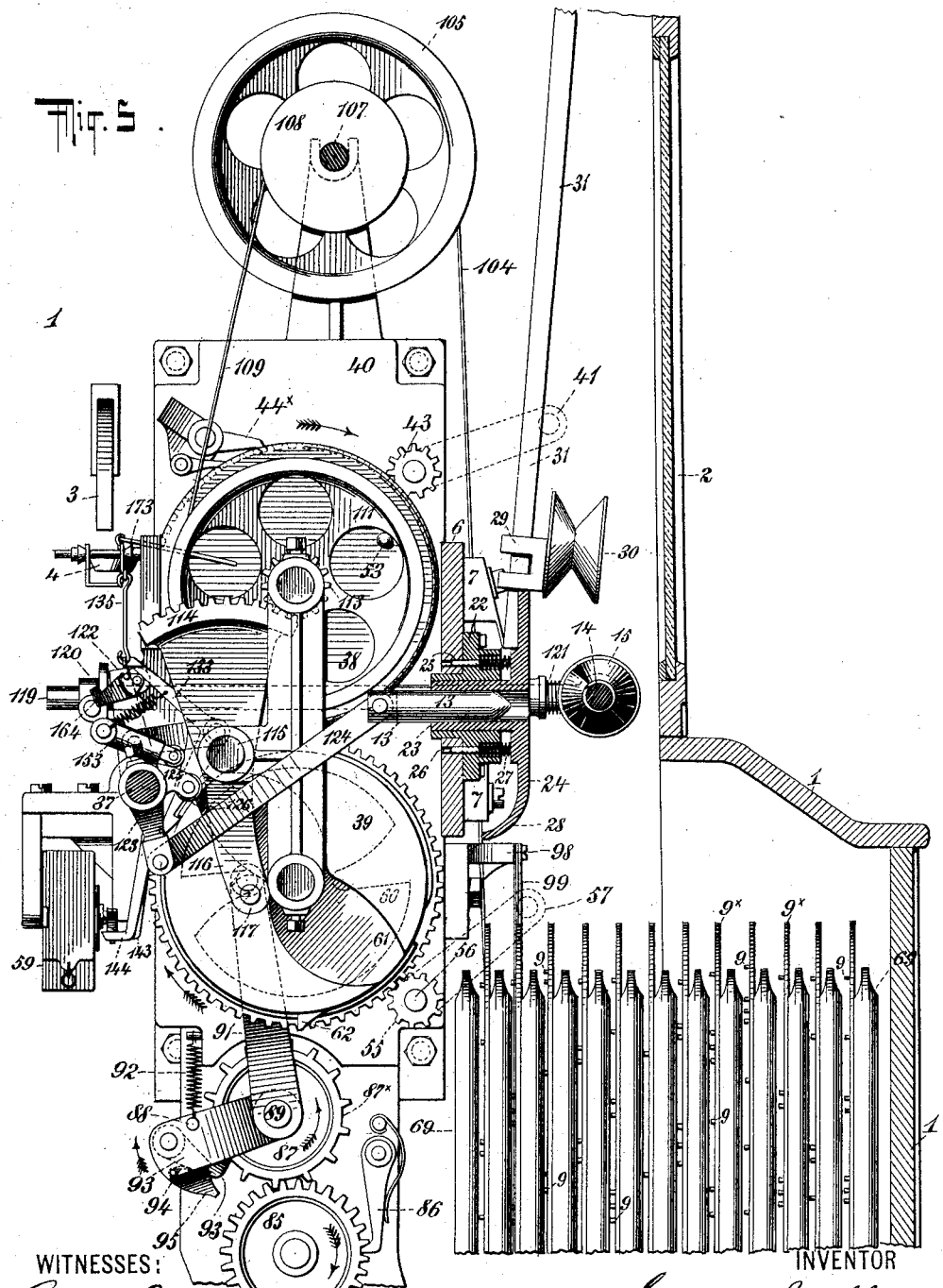
WITNESSES: INVENTOR
Gustave Dieterich Gustav. A. Brachhausen
Charles E. Smith BY
Briesen & Knauth
ATTORNEYS

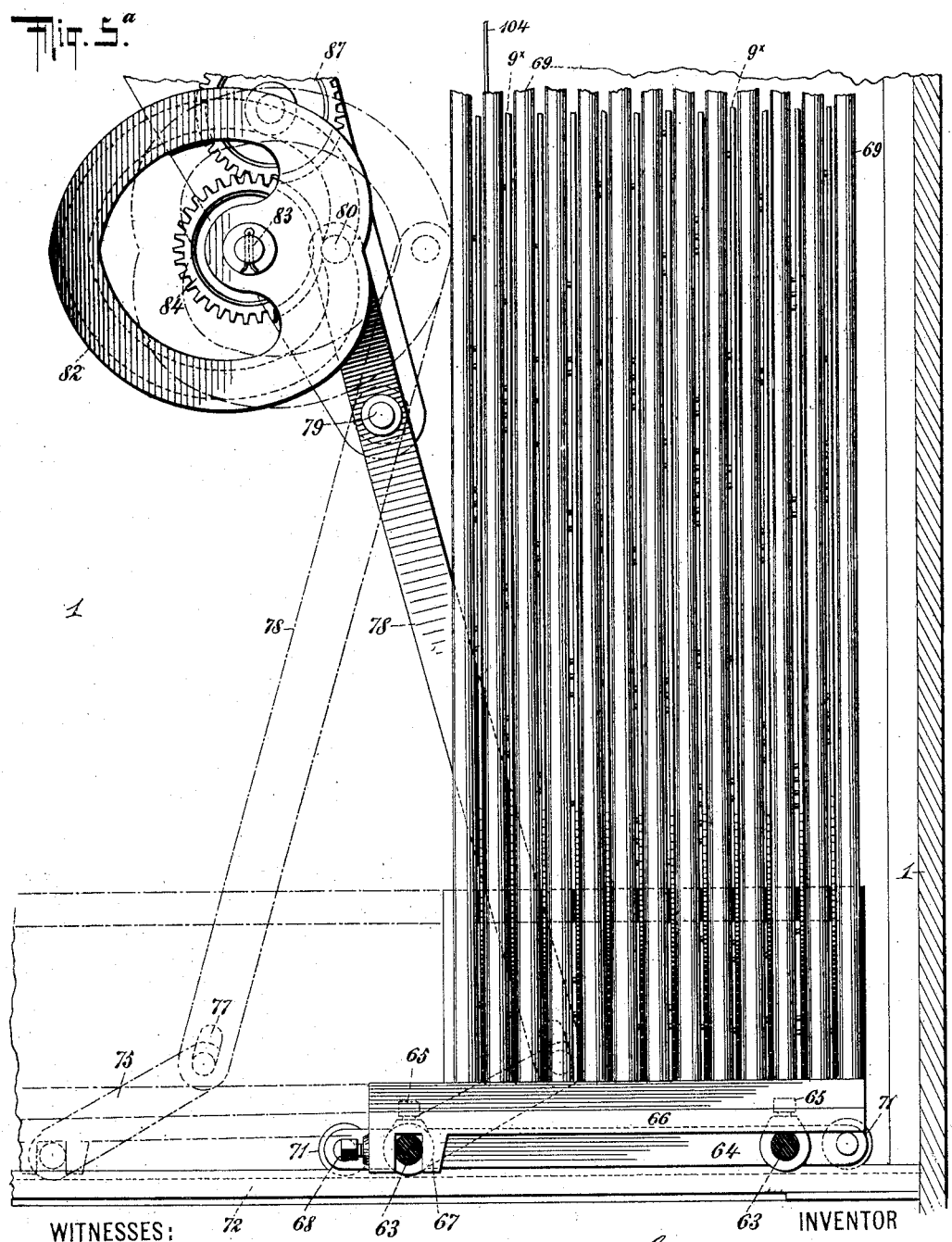

No. 621,025. Patented Mar. 14, 1899.
G. A. BRACHHAUSEN.
AUTOMATIC MECHANICAL MUSICAL INSTRUMENT.
(Application filed Apr. 25, 1898.)
(No Model.) 13 Sheets—Sheet 7.
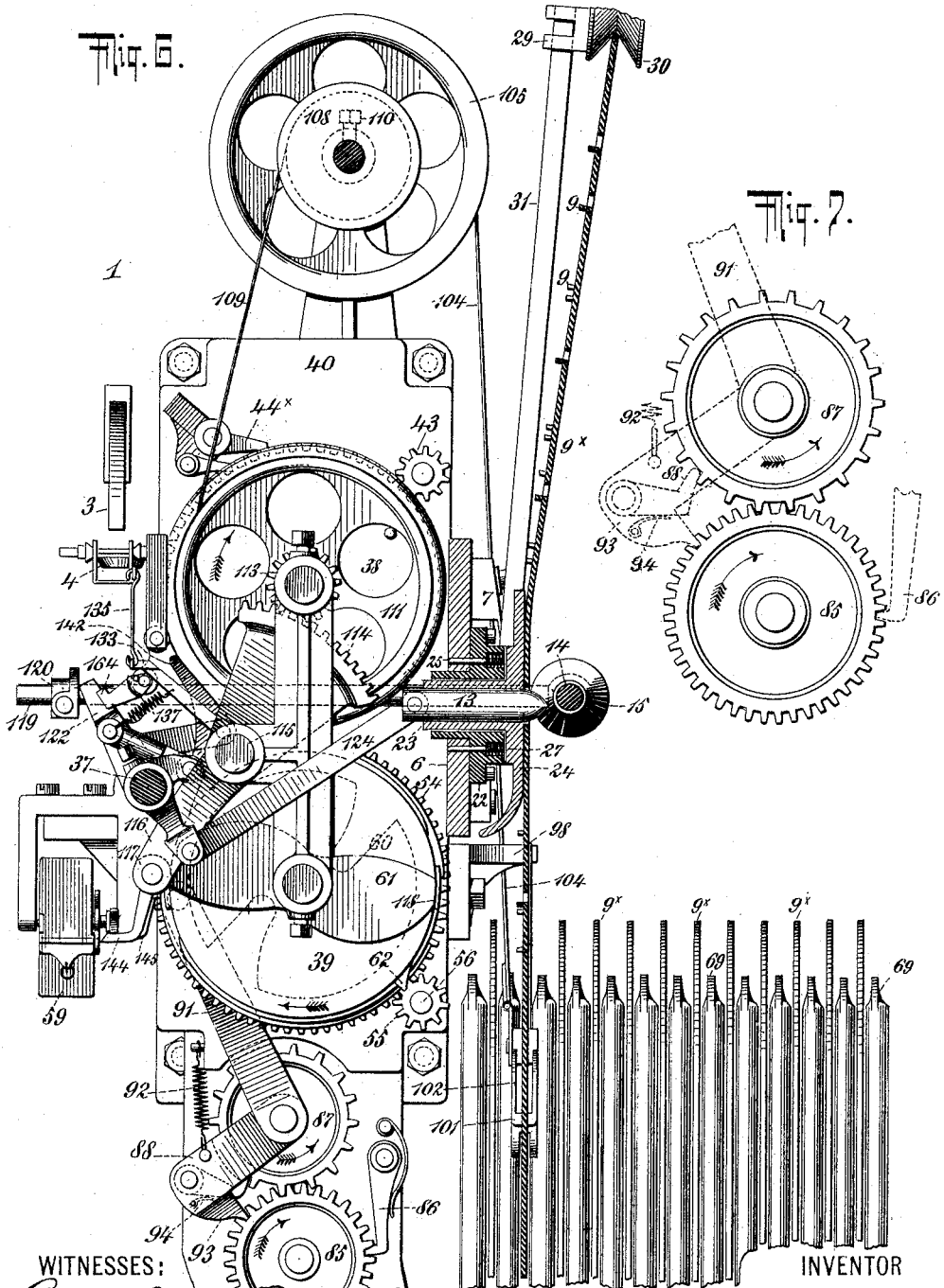
WITNESSES:
Gustave Dieterich
Charles E. Smith
INVENTOR
Gustav A. Brachhausen
BY
Briesen & Knauth
ATTORNEYS No. 621,025. Patented Mar. 14, 1899.
G. A. BRACHHAUSEN.
AUTOMATIC MECHANICAL MUSICAL INSTRUMENT.
(Application filed Apr. 25, 1898.)
(No Model.) 13 Sheets—Sheet 8.
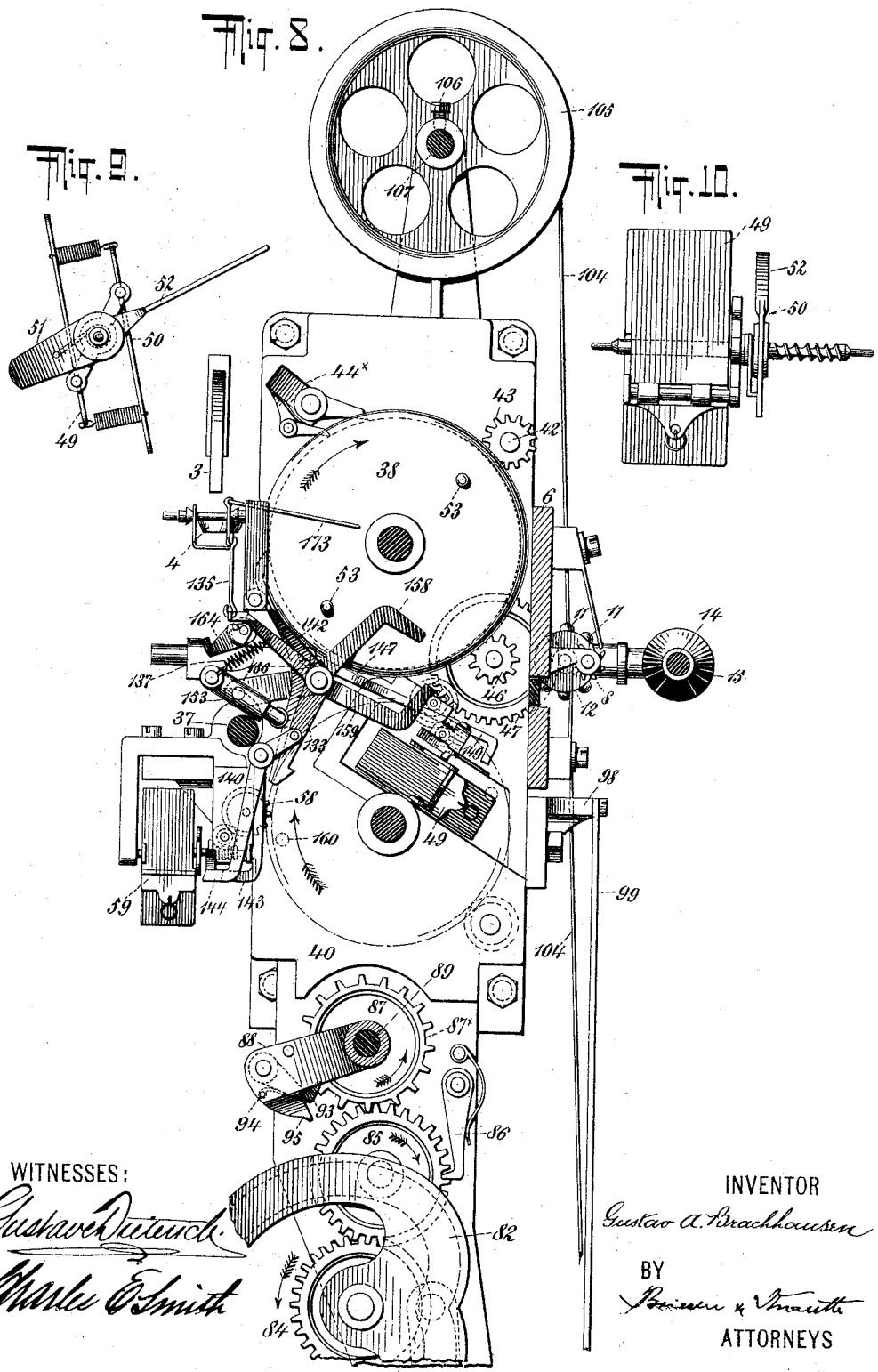

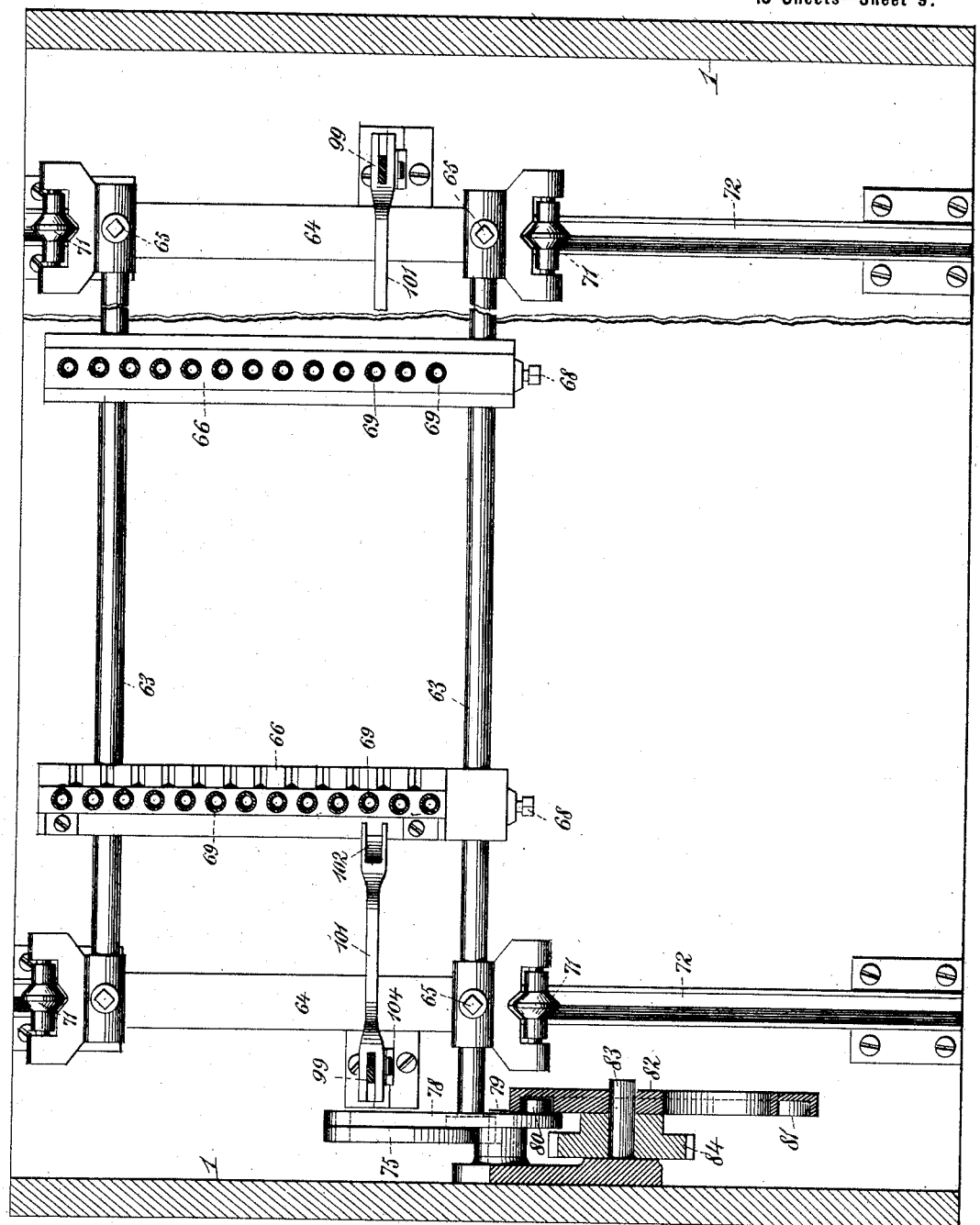

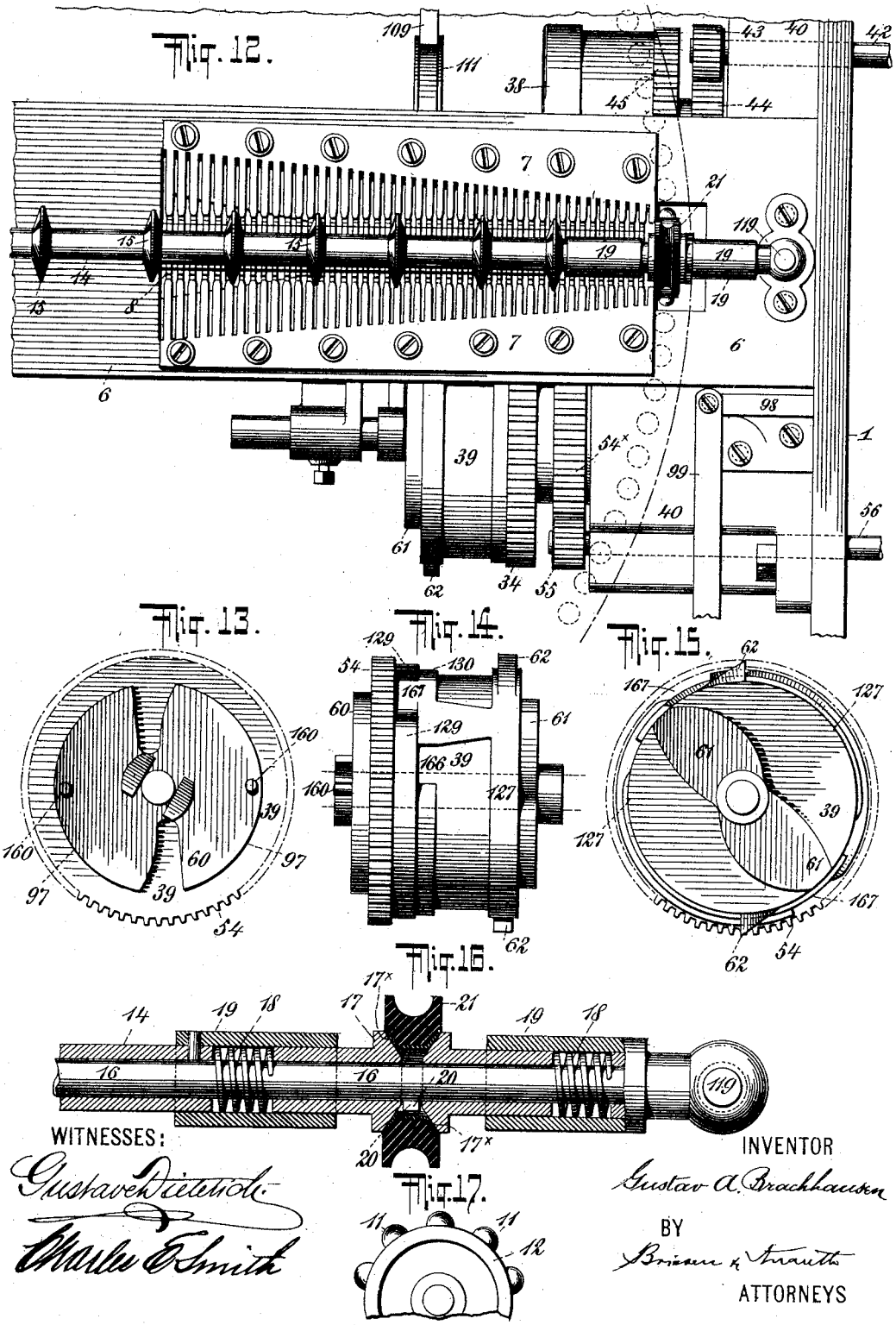

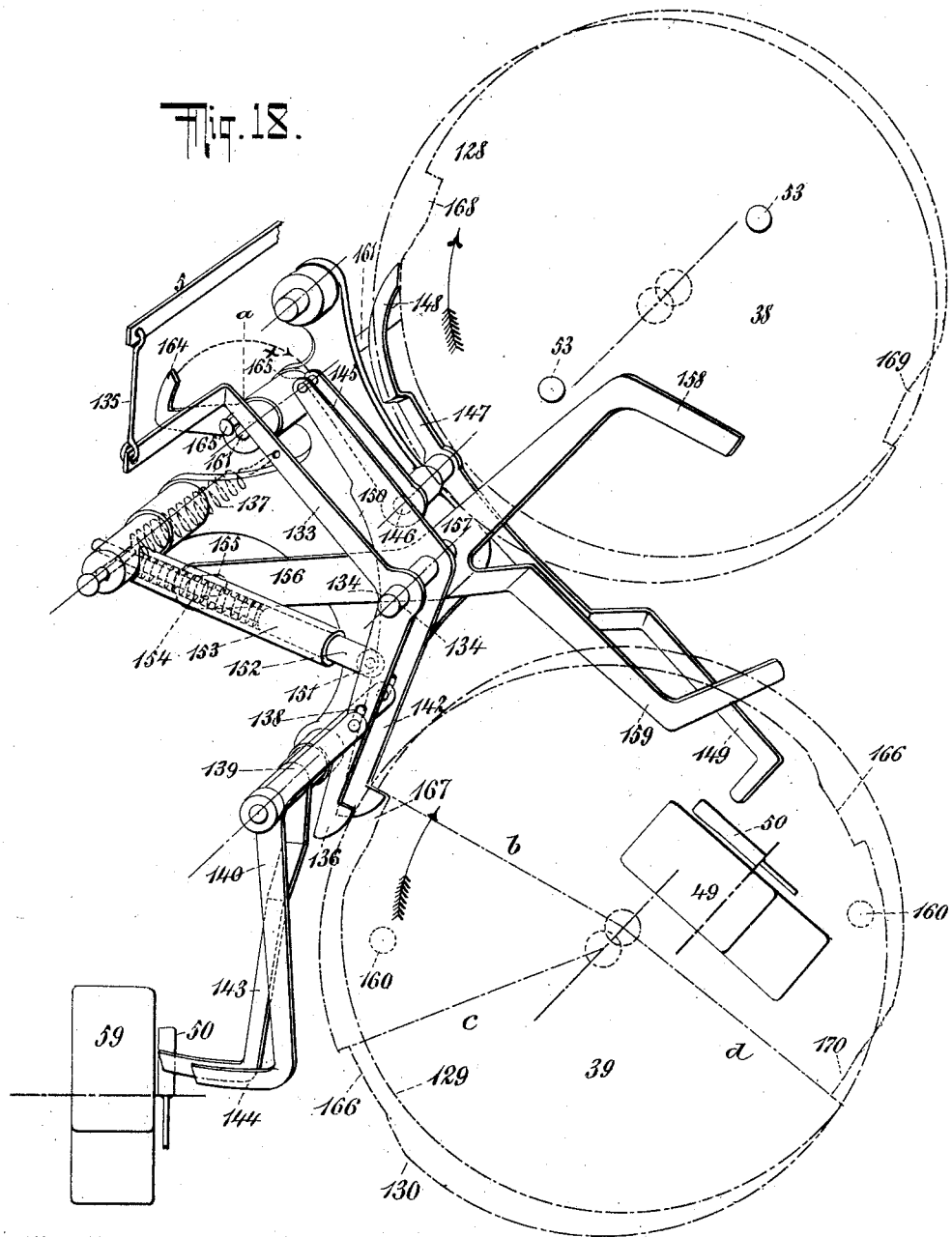

No. 621,025. Patented Mar. 14, 1899.
G. A. BRACHHAUSEN.
AUTOMATIC MECHANICAL MUSICAL INSTRUMENT.
(Application filed Apr. 25, 1898.)
(No Model.) 13 Sheets—Sheet 12.
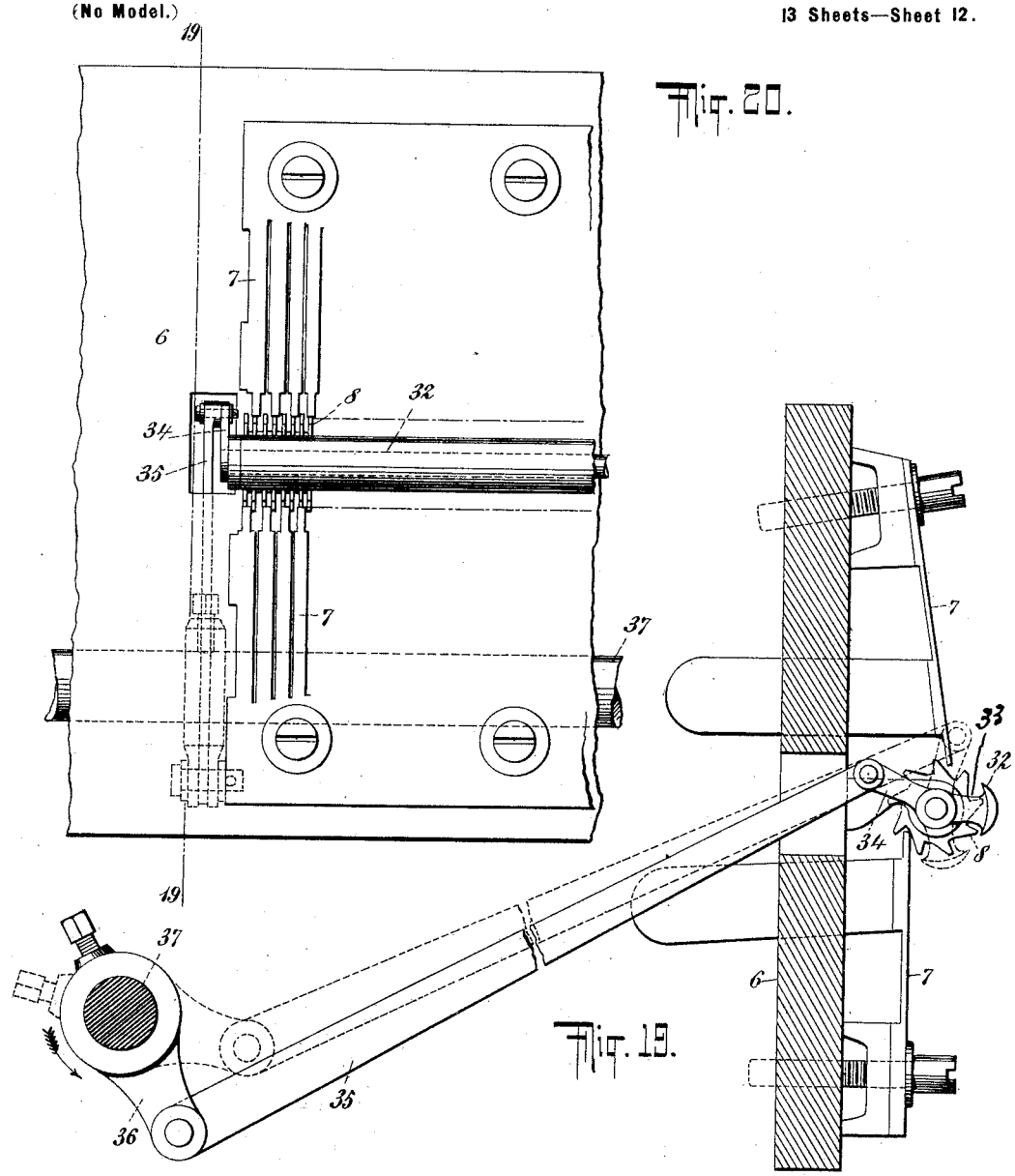

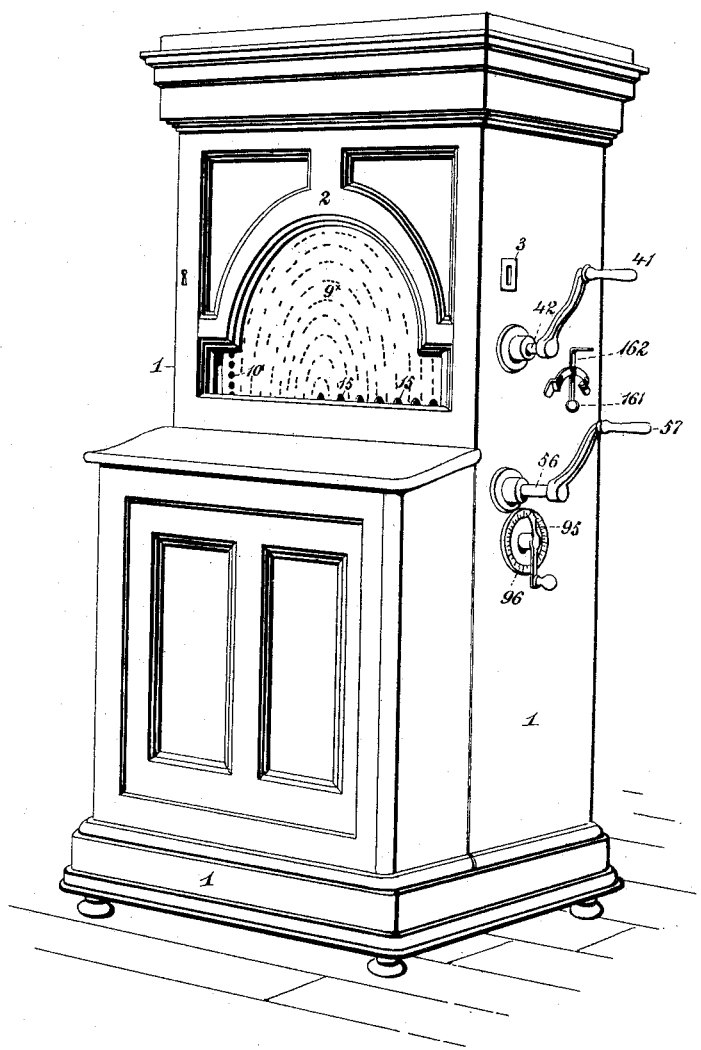

UNITED STATES PATENT OFFICE.

GUSTAV A. BRACHHAUSEN, OF RAHWAY, NEW JERSEY.

AUTOMATIC MECHANICAL MUSICAL INSTRUMENT.

SPECIFICATION forming part of Letters Patent No. 621,025, dated March 14, 1899.

Application filed April 25, 1898. Serial No. 678,773. (No model.)

*To all whom it may concern:*

Be it known that I, GUSTAV A. BRACHHAUSEN, a resident of Rahway, Union county, State of New Jersey, have invented certain new and useful Improvements in Automatic Mechanical Musical Instruments, of which the following is a full, clear and exact description.

My invention relates more particularly to automatic mechanical musical instruments in which separate note disks or sheets are automatically fed to and from operative position.

The object of my invention is to provide a musical instrument wherein the note disks or sheets can be automatically fed to and from operative position either successively, in accordance with a predetermined arrangement, or wherein any desired disk or sheet may be conveyed out of its order to operative position, and wherein the various operations of the parts are brought about with the utmost accuracy and precision.

A further object of my invention is to provide a compact instrument of the character specified wherein there is no liability of injury to the device or the note-disks used therein and wherein the proper automatic operation of the parts will occur under all conditions and circumstances.

To these ends my invention consists in the novel arrangement and combination of parts hereinafter described and claimed.

In the accompanying drawings, wherein like reference characters indicate corresponding parts in the various views, Figure 1 is a rear view of one form of instrument embodying my invention with parts of the casing broken away to show the operating mechanism. Fig. 2 is an enlarged detail plan view of the operating mechanism, the view being taken through the line 2 2 of Fig. 1. Fig. 3 is an enlarged detail fragmentary rear view of the operating mechanism. Fig. 3ª is a rear view corresponding to Fig. 3 and showing a continuation of the parts represented at the lower portion of Fig. 3. Fig. 4 is an enlarged detail fragmentary front view of a portion of the note-disk carriage and its coöperating rail. Fig. 5 is a vertical sectional view of the operating mechanism, the view being taken on the lines 5 5 of Figs. 2 and 3 and the parts being shown in the normal position which they assume when in a state of rest. Fig. 5ª is a view corresponding to Fig. 5 and shows a continuation of the parts represented at the lower portion of said figure. Fig. 6 is a view corresponding to Fig. 5, except that the parts are shown in the position they assume when the device is in operation—that is to say, when the note-disk has been elevated to the operative position, has been clamped in place and is being revolved by its driving-wheel, and the carriage is locked against movement. Fig. 7 is an enlarged detail side view of the note-disk-carriage operating and locking gears, to be hereinafter described. Fig. 8 is a vertical sectional view of the operating mechanism, which view is taken on the line 8 8 of Fig. 2 looking in the direction of the arrow, the note-disk carriage and disks being omitted for the purpose of clearness. Fig. 9 is a top detail view of the governor which I prefer to use in my improved instrument. Fig. 10 is a detail side view of the same. Fig. 11 is a detail transverse sectional view taken on the line 11 11 of Fig. 1, the view presenting the note-disk carriage and its coöperating parts. Fig. 12 is an enlarged fragmentary face view of the bed-plate, the vibrating tongues mounted thereon, and adjacent parts. Fig. 13 is a detail end view of what I term the "auxiliary" drum. Fig. 14 is a side view of the same. Fig. 15 is an end view of the same looking in a direction opposite from that in which the drum is viewed in Fig. 13. Fig. 16 is an enlarged central longitudinal sectional detail of a portion of the presser-bar and the parts carried thereby. Fig. 17 is a detail fragmentary face view of the note-disk-driving wheel. Fig. 18 is a diagrammatic perspective view of the motor controlling or shifting mechanism and the parts which coöperate therewith. Fig. 19 is a transverse section taken through the bed-plate and illustrates a modified form of automatic note-teeth-protecting device, to be hereinafter described. Fig. 20 is a plan view of the same, and Fig. 21 is a perspective view of the instrument.

I will first give the general outline of the operation of an automatic musical instrument embodying my invention and will then proceed to give a detailed description of the mechanism and the operation of the individual parts.

The entire apparatus is automatic in operation, it merely requiring the insertion of a coin or the movement of a starting-lever to bring about the operation of the instrument, and the insertion of a coin or a shifting of the starting-lever after each tune has been played will automatically cause the instrument to play a tune different from the last preceding tune. Thus when a coin has been properly deposited in the instrument or a hand-operated starting-lever has been moved the parts are set in operation and the note-disk carriage will be automatically moved to bring the note-disk next to the last one played into a position to be conveyed into the operative position by the disk-transporting mechanism. The carriage is then automatically locked against movement and the transporting mechanism moves the disk into operative position, where it is clamped in position and makes one revolution around its pivot. After the note-disk has completed a revolution the clamping means are withdrawn and the disk is lowered into its place in the carriage and the parts come to rest and are ready to be again operated by the insertion of a coin or by moving a hand-operated starting-lever.

Special reference being had to Figs. 1 and 21, it will be seen that the entire mechanism is contained within a casing 1, which may be provided with a suitable door 2 to give access to the instrument when occasion requires. The casing may likewise be provided with a coin chute or drop 3, which extends to the outside of the casing to allow of the insertion of a coin, which preferably first passes through a suitable coin-tester (not shown) and is conveyed through said coin-chute to the coin-tray 4 of a starting-lever 5. The starting-lever may, however, be the usual or any suitable hand-controlled lever projecting to the outside of the casing and one form of which will be hereinafter described.

Within the casing 1 is mounted a bed-plate 6, which carries the sound-producing instrument, which consists in the present instance of steel combs 7, the teeth of which are adapted to be vibrated by a series of star-wheels 8, Figs. 8 and 12, that are rotated by projections 9 on a note disk or sheet $9^\times$. The note-disk $9^\times$ is provided with a rack 10, that is adapted to be engaged by the substantially semiglobular studs 11 of a driving-wheel 12. When a note-disk $9^\times$ is elevated into the operative position, as indicated in Figs. 1 and 6, a movable note-disk pivot 13 is automatically projected through a central aperture in the note-disk, and a presser-bar 14, carrying antifriction-rollers 15, is automatically moved toward the note-disk, and the antifriction-rollers bear thereon to clamp it in the operative position on the pivot 13, Fig. 6, at the same time causing the rack 10 to engage the driving-wheel 12, as indicated in Fig. 12. The clamping action of the presser-bar 14 is automatic and positive, and in order to provide against injury to the instrument or the note-disk should a stud 11 on the driving-wheel engage the imperforate portion of the rack 10 when the presser-bar causes an engagement of the parts I employ the means illustrated in detail in Fig. 16 of the drawings. In this figure it will be observed that a central rod or bearing 16 is carried by the presser-bar 14, and on this bearing are supported longitudinally-movable heads 17, which project in opposite directions and are beveled, as indicated at $17^\times$. These heads are normally maintained in the projected position by springs 18, which are preferably surrounded by sleeves 19, and the movement of the heads in the projected position is limited by a pin 20, carried by the rod 16. Between the movable heads 17 is carried a roller, which is preferably grooved on the periphery to receive the teeth 11 of the driving-wheel 12, and the supporting-faces of said roll are preferably beveled inwardly, so as to present coöperating faces against which the said heads are adapted to bear. By this means it will be observed that as long as the strain against the periphery of the roll 21 is less than the tension exerted by the springs 18 the parts will remain in the position shown in Fig. 16. However, should the strain upon the periphery of the roll become greater than the tension of the springs 18, as when a stud 11 on the driving-wheel 12 meets an imperforate portion of the rack, the periphery of the roll 21 will be forced toward the rod 16, thereby forcing the heads 17 from the roll and against the tension of their springs. As soon as the obstruction is passed or a proper engagement of the driving-wheel with the rack is had the roll will again automatically resume its normal position, as represented in Fig. 16. By making the studs 11 on the driving-wheel semiglobular in form the studs are capable of moving over the full or imperforate portion of the rack 10 should they by accident be brought into engagement therewith when movement is imparted to the driving-wheel, whereas under similar conditions the usual form of conoidal stud might be more liable to puncture the disk without sliding over it.

When a note-disk is being moved to and from operative position in the instrument, there is a liability of the teeth 9 on the disk coming in contact with the teeth of the star-wheels, which results either in producing a series of unharmonious sounds or in breaking off the note projections on the disks. In order to provide against any such contingency, I employ the following instrumentalities.

Special reference being had to Figs. 5 and 6, it will be observed that a bushing 22 is secured to the bed-plate 6. This bushing is adapted to receive a sleeve-like extension 23 of a guide or shield plate 24, and the sleeve-like extension is adapted to receive the movable note-disk pivot 13 and to allow said pivot to be projected through and beyond the face of the shield, as represented in Fig. 6. The shield is provided with suitable means to prevent it from rotating—such, for instance, as the pin 25, which projects into a hole 26—and the springs 27 normally maintain the shield in the projected position. The lower portion of the shield is preferably bent inward, as indicated at 28, so that should a note-disk contact therewith it will be guided to the outer face of the shield and be prevented from catching behind it. It will thus be observed that the shield will be maintained beyond the line formed by the tops of the star-wheels when the parts are in the position of rest indicated in Fig. 5 and that when the note-disk is moved up into the operative position the teeth of the disk will be prevented from coming into contact with the star-wheels. When, however, the presser-bar 14 is moved inward, the shield will be moved against the tension of its springs and the note-disk will be moved to a position where the teeth thereof may engage the star-wheels.

In addition to the shield 24 a movable gravity-guide may be provided. In the present instance this guide consists of a sleeve 29, which carries a grooved roller 30 and is mounted upon an inclined rod 31, which may be mounted upon the shield 24. When the note-disk is raised, the upper edge thereof will be guided to the groove of the roller 30, and as the disk is raised farther it will carry the gravity-guide up with it. This movement of the guide will cause the upper end of the note-disk to be deflected outwardly by reason of the inclination of the rod 31. The outward deflection of the top of the note-disk will cause the note-disk to be maintained in contact with the rollers on the presser-rod 14 and will thus prevent the teeth of the note-disk from coming into contact with the star-wheels.

In place of or in addition to the hereinbefore-described mechanism for preventing the note-teeth from contacting with the star-wheels when the note-disks are being moved to and from operative position I may employ the device shown in Figs. 19 and 20, from which it will be seen that a segmental protector bar, guide, or shield 32 is connected to arms 33, that are pivoted at each end of the standard of the star-wheels and preferably on the axis of revolution of said star-wheels. To one of these arms is connected a crank-arm 34, to the end of which is pivotally connected a link 35, which is pivoted at its opposite end to a crank-arm 36, carried by and adjustably connected with the rock-shaft 37. It will thus be observed that a partial rotation of the rock-shaft in the direction of the arrow will cause the bar 32 to be moved out of the full-line position represented in Fig. 19 to the dotted-line position, thereby carrying the bar out of the position where it will prevent the teeth on the note-disk from engaging the star-wheels. The oscillation of the protector-bar 32 to the dotted-line position takes place at the same moment that the pivot 13 is moved outward and the presser-rod 14 is moved in to clamp the sheet in position. The presser-bar and the pivot are both operated from the rock-shaft 37, as will be hereinafter described, so that the simultaneous movement of the protector-bar 32, the pivot of the note-disk, and the presser-bar is effected.

Two drums or spring-motors are preferably employed to bring about the various operations of the parts. One drum 38, which I term the "main" drum, merely rotates the note-disk-driving wheel 12 to cause the playing of the musical instrument proper. The second drum 39, which I term the "auxiliary" drum, effects an operation of the various instrumentalities to bring about the movement of the note-disk carriage, the movement of the note-disk to and from operative position, the movement of the note-disk pivot and presser-bar to clamp the disk in operative position and to release the same, &c. Mechanism which will be hereinafter referred to is provided for stopping one drum or motor when the other is set in operation. The main and auxiliary drums, together with most of the mechanism coöperating therewith, are carried by the single casting 40, which may be secured to one side of the casing 1, as indicated in Figs. 3 and 8. By these means the parts are so disposed that they lie comparatively close to and most of the weight is borne by one side of the casing, where ample support is afforded for the mechanism.

The main drum is wound by a handle 41, which is adapted to engage a winding-post 42, that carries a pinion 43, which engages the winding-gear 44. This gear 44 is connected to the inner end of the spring (not shown) preferably in the manner shown and described in my Patent No. 547,839, dated October 15, 1895. This gear 44 is prevented from backward movement by suitable pawls $44^\times$, which engage therewith, while the drum itself is provided with the usual circumferential gear 45, which gear meshes with a pinion 46, connected with a gear 47, that engages the pinion 48 on the driving-wheel 12. A suitable train of gear is likewise driven by this gear 47, as indicated in Fig. 8, and thus communicates motion to the governor 49, preferably of the character represented in Figs. 9 and 10. The governor 49 is provided with an arm 50, which is held friction-tight at its flattened portion 51, and the arm is bent at right angles, as indicated at 52. By this means a stop-arm is provided for the governor which is rigid in construction and is not liable to be bent aside when it is suddenly brought into engagement with its stopping-lever, as is the case with governors of the ordinary construction. The drum 38 is provided upon one side or end with oppositely-disposed pins 53, as indicated in Fig. 8, for purposes which will hereinafter appear.

A half-revolution of the auxiliary drum or motor 39 brings about the operation of the various parts of the device, except the rotation of the note-disk around its pivot, which rotation is produced by a half-revolution of the main drum. The main and auxiliary drums are preferably of such relative power that a single winding of the main drum will effect a rotation of all the note-disks in the carriage and a single winding of the auxiliary drum will effect a corresponding number of operations of the various parts of the device, so that both drums or motors may be wound together and will run for the same length of time.

The auxiliary drum 39, which is illustrated in detail in Figs. 13, 14, and 15, is preferably mounted in substantially the same manner as the main drum and is provided with the usual peripheral gear 54, which is engaged by a suitable pawl (not shown) to prevent a backward movement thereof. Coöperating with the winding-gear $54^{\times}$ of this drum is a winding-pinion 55, carried by a winding-stem 56, which projects to the outside of the casing and may be wound by a suitable handle 57. The gear 54 meshes with a gear 58, which forms part of a train of gear, Fig. 8, which communicates motion to a governor 59, which is preferably constructed in the manner illustrated in Figs. 9 and 10. The auxiliary drum is provided with a series of cams which may be cast integral with the drum and the purpose of which is to bring about the auxiliary movement of the parts. Thus one-half of the cam 60 effects a movement of the carriage and its locking mechanism, one-half of the cam 61 causes a note-disk to be fed to operative position and to be returned to the carriage, and one of the cams 62 operates the note-disk pivot and presser-bar.

I will describe the mechanism operated by the auxiliary drum in the order in which the operations take place.

The note-disk carriage, which first receives movement, is in the present case constructed with a view to positiveness of action, simplicity of construction, ready removal from the instrument, and to facilitate the mounting and dismounting of the parts.

The note-disk carriage and its coöperating mechanism are best illustrated in Figs. $3^{a}$, 4, $5^{a}$, and 11, in which figures it will be observed that cross-bars 63 are removably connected to side bars 64, as by means of set-screws 65. A suitable number of supporting-bars 66 extend across and are supported by the cross-bars 63. As shown, one end of each of these bars 66 is provided with a yoke or forked portion 67, which straddles one of the cross-bars 63 and is held in such position by a set-screw 68. The opposite end of each of the bars 66 is supported upon the other cross-bar 63. From the upper face of bars 66 project dividing pieces or rods 69, between which the note disks or sheets 9 are adapted to be received and prevented from lateral displacement. The bars 66 may likewise be provided with V-shaped grooves between the rods 69 to receive the edges of the disks and further aid in maintaining the disks properly located upon the carriage. Each of the side bars 64 is provided with wheels 71, which are adapted to run upon suitable tracks 72, which may be secured to the base of the casing. These tracks 72 are provided with flanges 73, under which a removable catch or lug 74, carried by each of the side bars 64, is adapted to engage to prevent the carriage from being displaced from the tracks.

In order to move the note-disk carriage, I provide a rigid arm 75, which extends from one of the cross-bars 63 of the carriage. This arm is provided with a pin 76, which passes through a slot 77 in an operating-lever 78, which is pivoted at 79, and at its opposite end carries a bowl or roller 80, which operates in an internal cam-groove 81 of a heart-shaped cam 82. This cam is pivoted as indicated at 83 in Fig. 11 and has a gear 84 connected therewith. Meshing with the gear 84 is a gear 85, which is prevented from moving in a direction opposite to that of the arrow in Fig. 8 by a pawl 86. With the gear 85 meshes a gear 87, which is provided with substantially twice as many teeth as there are note-disks in the carriage, and in order to economize space it is provided with only one-half the number of teeth on the gear 85. By arranging the teeth on the gears 85 and 87 in the manner described two teeth on the gear 85 mesh between every two teeth on the gear 87. A further reason exists for arranging the teeth on the gear 87 in the manner described and for providing the spaces $87^{\times}$ between the teeth, as will hereinafter appear. Connected to the gear-wheel 87 is a pointer 95, which rotates therewith, but is carried at the outside of the casing and coöperates with an index-dial 96, that bears the numbers of the tunes which are adapted to be played by the disks in the carriage. A vibrating arm 88 is pivoted as indicated at 89 and is provided with a locking-nose 90, which is adapted to be forced into engagement with the teeth of the gear-wheel 85. To the arm 88 is connected an arm 91, which carries a roller at its outer end that is adapted to bear against the edge of the cam 60 on the drum 39 and is maintained in engagement with said cam by a spring 92, which is connected at one end to the arm 88 and at the other end to a stationary portion of the instrument. The arm 88 likewise carries a pivoted pawl 93, which is under tension of a spring 94, by which the pawl is maintained in engagement with the gear 87. The inner face of this pawl is so shaped that it will allow the pawl to ride over the teeth of the gear-wheel 87 when the arm 88 moves in an upward direction, whereas the outer face of the pawl will engage the teeth and transmit movement to the gear when the arm 88 is moved in an opposite direction. It will thus be understood that when the arm 91 is vibrated from the position illustrated in Fig. 5 to that illustrated in Fig. 6 by the cam 60 the pawl 93 will cause the gear 87 to be moved in the direction of the arrow and will transmit motion to the gear 85 until the nose 90 on the arm 88 is brought into engagement with the gear 85, when the parts will be locked against further movement, leaving the roller on the end of the arm 91 resting on the semicircular outside portion 97 of the cam 60. The movement transmitted to the gear 85 is imparted to the gear 84 and the cam 82, connected therewith, which effects a movement of the carriage through the intermediate lever 78, thereby bringing the desired note-disk to a position where it can be engaged by the transporting mechanism.

It often occurs that the pointer 95 is not properly set by hand directly opposite a numeral on the dial 96. This results in the carriage being set in a position where one of the note-disks is not in exact register with the transporting mechanism, and if the device were operated when the parts are in this position injury to the entire device would be liable to result. Even if no injury to the device resulted each successive automatic operation of the carriage ordinarily would convey a note-disk out of register and the pointer would be brought between the numbers on the dial, so that a determination of the tune to be played could not be arrived at. However, by providing the spaces $87^\times$ between the teeth on the gear-wheel 87 a portion of the feed-stroke of the pawl 93 will be made independently of the gear-wheel if the pointer has been improperly set and the teeth will always be left in the same relative position by the automatic operation of the device irrespective of the position that the pointer has been set in by hand. Thus, for instance, suppose that the pointer has been set by hand between two numbers on the dial instead of opposite one of them. This results in the tooth on the gear which corresponds to one of the two numbers on the dial between which the pointer has been set being moved, say, one-half of the distance it has to travel in the feed of the carriage. Now when the pawl 93 is again automatically operated it moves in a space $87^\times$ without transmitting motion to the gear 87 until, say, half of the feed movement of the pawl is completed, when the pawl is brought into contact with the next tooth of the gear and the gear is moved a distance which corresponds to the remaining portion of the feed movement of the pawl. After the completion of this feed movement the carriage and all parts of the carriage-moving mechanism will have been properly set and the pointer will point directly to the numeral on the dial corresponding to the tune to be played. By these means, therefore, no injury to the device as a whole can result from the improper setting of the pointer by hand and an accurate register of the parts and the proper automatic operation of the device are assured under all conditions.

I will next describe the transporting mechanism or the means for conveying the note-disk to and from operative position.

From the face of the framing on each side of the instrument project brackets 98, to each of which is secured the upper end of a guide-rod 99, Fig. 8, the lower end of each of these rods being secured at the lower end to a suitable bracket 100, Fig. 3ª. Upon these rods a pair of note-disk-transporting arms 101 are adapted to slide. Each of the note-disk-transporting arms comprises a bifurcated end 102, which is adapted to receive the edge of a note-disk and the sleeve-like members 103, which are adapted to surround a guide-rod 99. The arms 101 coöperate to grasp a note-disk 9 upon opposite sides and to raise or lower the note-disk when the metal bands 104, one of which is connected to each of the slides, are moved. Each of the bands 104 has its end secured to a pulley 105. These pulleys 105 are adjustably fixed, as indicated at 106, upon a rotating shaft 107, which likewise carries a single fixed pulley 108, which is adjustable by means of the set-screw 110 and to which is secured one end of a metallic band 109. The other end of this band is connected to a pulley 111, which is fixed upon a shaft 112, that carries a pinion 113, with which a segmental rack 114 meshes. This rack 114 is pivoted as indicated at 115, and a depending arm or extension 116 of said rack projects beyond the pivot and carries a roller 117, which is adapted to bear upon the edge of the cam 61. It will be observed from Fig. 5 that the bands 104 and 109 pass around their respective pulleys in opposite directions, so that when the parts are in the position illustrated in Figs. 5 and 5ª and the auxiliary drum 39 is rotated in the direction of the arrow the roller will ride on the cam from a point near the center of rotation of the drum to a point near its periphery. This movement of the cam 61 causes the segmental rack 114 to be shifted from the position illustrated in Fig. 5 to the position indicated in Fig. 6, and motion is transmitted to the pulley 111, the band 109, the pulleys 105, the bands 104, and the transporting-arms 101 to raise the note-disk into operative position, which is indicated in Fig. 6. At this time the roller 117 bears upon one of the two "waits" or flat portions 118 of the cam 61. When the cam is again moved, it will cause the roller 117 to move to the opposite side thereof and to attain the same relative position that it stood in when the instrument started to operate. This movement of the roller 117 on the opposite side of the cam lowers the note-disk to its place on the carriage and the weight of the arms 101 tends to maintain the roller in engagement with the cam. It will thus be observed that a half-revolution of the auxiliary drum 39 causes the note-disk to be moved to the operative position to be lowered again.

After the note-disk has been moved to the operative position it is necessary to move the pivot 13 and the presser-bar 14, and I will now describe the means for effecting these movements.

The presser-bar 14 is connected at each end to a bar 119, which passes through the bed-plate 6 and is provided with an adjustable collar 120, while the springs 121, surrounding the rods 119 at the outer ends, tend to normally maintain the presser-bar 14 in the released position shown in Fig. 5. Near each end of the rock-shaft 37 is adjustably secured an arm 122, which is bifurcated at its upper end, so as to straddle the rod 119 and bear upon the rear face of the sleeve 120. The rock-shaft 37 likewise has adjustably connected therewith an arm 123, to which is connected a link 124, that is likewise pivotally connected to the note-disk pivot 13, which, as before explained, is adapted to reciprocate in the sleeve-like extension 23 of the shield 24. The rock-shaft also has adjustably secured thereto an arm 125, that carries a roller 126, which stands in the path of the cams 62 on the auxiliary drum 39. It will thus be observed that after the note-disk has been conveyed to operative position in the instrument the drum 39 attains the position illustrated in Fig. 6, when one of the cams 62 is brought into contact with the roller 126, as shown in dotted lines in this figure, and the arm 125 is shifted. This shifting of the arm 125 causes the shaft 37 to be rocked, thereby projecting the pivot 13 through the central hole in the note-disk and simultaneously causing the presser-bar to be moved toward the note-disk by the action of the arms 122 upon the collars 120, as indicated in Fig. 6. It is obvious that a further movement of the drum 39 from the position illustrated in Fig. 6 will allow the roller 126 to run off the cam and to rest upon one of the plain semicylindrical portions 127 of the drum. This action releases presser-bar 14 and withdraws the pivot from the hole in the note-disk.

I now come to the mechanism for automatically starting one of the drums or motors when the other is brought to a state of rest in order to automatically bring about the various operations or cycle of movements of the device. This mechanism is illustrated in detail in the diagrammatic perspective view shown in Fig. 18. In this figure the main and auxiliary drums 38 and 39, respectively, are represented by the dotted circles, of which the circle 128 represents the cam-track on the main drum, whereas the circles 129 and 130 represent the cam-tracks on the auxiliary drum. A casting 131 is secured to the casting 40, as indicated at 132 in Fig. 3. This casting 131 carries the mechanism for setting one drum into operation when the other is stopped. Thus the lever 133 is pivoted on a pin 134, and one end of this lever is operatively connected to the starting-lever 5 by the link 135, while the other end of the lever 133 is provided with a hook-like projection 136, that is adapted to bear upon the cam-track 130 and is maintained in contact therewith by a coiled spring 137. Near the end 136 of the lever 133 is connected, by means of a slot-and-pin connection 138, the arm 139 of the stop-lever 140, which has an arm 144, that is adapted to extend into the path of the arm 50, carried by the governor 59 when the parts are in a state of rest. While the starting-lever 5 and the levers 133 and 140 are themselves connected to each other, they are disconnected from the other parts of the starting and stopping mechanism and operate independently thereof, but are so timed as to coöperate therewith, as will hereinafter appear. A second lever 142, which is somewhat similar to the lever 133, is mounted upon the pin 134 and is connected to a stop-lever 143 in the same manner as is the lever 133. When the auxiliary drum 39 has been released and has made a partial revolution, the lever 143 is projected to the position indicated in Fig. 18 to stop the governor 59, as will hereinafter appear. The upper end of the lever 142 is connected to a crank-arm 145, carried by a rock-shaft 146, to the opposite end of which is fixed the stop-lever 147. The stop-lever 147 is provided at one end with a finger 148, which is adapted to bear upon the cam-track 128 of the main drum, and the other end 149 of this lever is adapted to project into the path of the arm 50 of the governor 49 of the main drum. The lever 142 is likewise provided with a cam-face 150, against which an antifriction-roller 151, carried by a spring-pressed pin 152, is adapted to bear. The pin 152 is moved laterally with and adapted to move longitudinally in a sleeve 153, which is pivoted to the casting 131. A spring 154 is contained within the sleeve 153 and is adapted to bear upon the pin 152 and tends to maintain the same in the projected position. The sleeve 153 is connected by a pin-and-slot connection 155 to the arm 156 of a three-arm lever 157, which is pivoted to the pin 134. The arm 158 of this lever 157 projects into the path of the pins 53 on the main drum, whereas the arm 159 projects into the path of the pins 160 on the auxiliary drum, and motion which is thereby imparted to either of said arms is transmitted to the pivoted sleeve 153 to shift it, together with the bearing-pin 152, to either side of the pin 134, which constitutes the pivot of the lever 142.

Now in order to provide hand-operated means for imparting movement to the motor-controlling mechanism above described to start the instrument a shaft 161 is journaled at one end in the casting 131 and extends at the opposite end to the outside of the casing, where it is provided with an operating-arm 162, Figs. 2 and 3, which coöperates with a scale or index 163, bearing three points or indications. The first designates the "stopping-point," the second the "starting-point," and the third the "repeating-point." The inner end of the shaft 161 carries a hook or catch 164 and an eccentric-pin 165, upon which the upper end of the lever 133 bears. When the operating-arm 162 is upon the stopping-point, the parts are in substantially the position indicated in Fig. 18, whereas when the operating-arm has been moved farther to the starting-point the catch will be rotated substantially to the line $a$, Fig. 18, when it will be observed the pin 165 has raised the upper end of the lever 133 to start the instrument. It will likewise be observed that this movement of the hand-operating lever in no way affects the operation of the automatic or coin-controlled lever 5. When the operating-arm is at the repeating-point, the catch 164 will have been moved far enough to engage the pin 165$^\times$, which connects the lever 142 and the crank-arm 145, thereby allowing the main drum to operate until such time as the operating-arm is moved to the stopping-point or the instrument runs down and will at the same time maintain the drum 49 out of action, as will hereinafter more clearly appear.

When the instrument is to be operated by the coin-controlled mechanism, a coin of a predetermined size and value is inserted in the coin-receiving opening and after having passed through a suitable coin-testing device (not shown) is conveyed to the coin-pan 4, and the weight of the coin depresses the outer end of the lever 5, thereby raising the upper end of the lever 133. This movement imparted to the lever 133 will withdraw the end 136 thereof from the depression 166 of the cam-track 130 and will on account of its connection with the lever 140 cause the hook-like end 144 of said lever to be withdrawn from the path of the arm 50 of the governor 59 and the instrument has been started.

Now in order that the operation of the motor-controlling mechanism may be fully understood I will take up the movement of the parts from the point where the governor 59 is released and will describe the operation of the controlling mechanism. Releasing the governor 59 allows the drum 39 to make a partial revolution—say from the line $b$ to the line $c$ in Fig. 18—when the end 136 of the lever 133 will still be retained upon the high portion of cam-track 130, but the corresponding end of the lever 142 will drop into the depression 167 of the cam-track 129. This movement of the lever 142 will cause the stop-lever 143, with which it is connected, to be projected into the path of the arm 50 of the governor 59 and will at the same time cause the arm 148 of the lever 147 to be withdrawn from the depression 168 in the cam-track 128 of the main drum by reason of the crank-arm connection 145 between the levers 147 and 142. As the upper end of the lever 147 is withdrawn from the depression 168 the lower end 149 of said lever will be withdrawn from the path of the arm of the governor 49 of the main drum, thereby allowing said drum to make a half-revolution. In making the half-revolution one of the pins 53 on the main drum contacts with the arm 158 of the lever 157, thereby causing the pivoted sleeve 153 to be vibrated to the opposite side of the pin 134. This movement of the sleeve will cause the pressure of the spring 154 to be exerted upon the lever 142 on the opposite side of its pivot 134 from that upon which the spring-pressed pin 152 is shown to bear in Fig. 18. It will thus be seen that by reason of the fact that pressure is now exerted upon the upper end of the lever 142 the end 148 of the lever 147 will be forced into the depression 169 of the main drum when it has completed one-half a revolution, thereby carrying the lower end 149 of said lever into the path of the arm 50 on the governor 49, and will stop it from revolving. It will be remembered that during this half-revolution of the main drum the auxiliary drum has been maintained against movement by the lever 143. Now at the time when the lever 147 is moved to stop the governor of the main drum the auxiliary drum is simultaneously released by reason of the crank-arm connection 145 between the levers 142 and 147. Thus when the upper end 148 of the lever 147 is forced into the depression 169 in the manner specified a movement will likewise be transmitted to the upper end of the lever 142, thereby withdrawing its lower end from the depression 167 in the auxiliary drum. This movement of the lever 142 will by reason of its connection with the stop-lever 143 cause said stop-lever to be withdrawn from the path of the arm 50 of the governor 59, when the auxiliary drum is free to rotate in the direction of the arrow a distance corresponding substantially to the distance between the lines $c\,d$ in Fig. 18. The rotation of the drum 39 from the lines $c$ to $d$ will bring one of the pins 160 into contact with the arm 159 of the lever 157 and will cause all the parts of the shifting mechanism to be moved back into the initial position represented in Fig. 18 and spring-pressure is again exerted by the pin 152 upon the lower end of lever 142.

It will be remembered that the stop-lever 140 and the parts connected therewith operate independently of the shifting mechanism, so that when the drum completes its movement from the lines $c$ to $d$ the depression 170 in the cam-track 129 will have been brought into the path of the end 136 of the lever 133 and said end will have been forced into the depression. The movement thus given to the lever 133 will cause the stop-lever 140, which is connected therewith, to be projected into the path of the arm of the governor 59, when the entire apparatus will be brought to rest.

From the foregoing description it will be seen that for each half-revolution of both drums a complete movement of the various parts is brought about, and that during a further movement of the main drum from the notch 169 to the notch 168 the operation hereinbefore described will be repeated, and that this is likewise true when the auxiliary drum is further rotated from the line $d$ to the line $b$.

I have made reference heretofore to the coin-pan 4 and starting-lever 5, and while the particular construction of starting-lever shown in the annexed drawings forms no part of my present invention and any suitable device may be used in its stead I will describe its construction and operation that a clearer understanding of the operation of the entire apparatus may be had.

The coin-pan 4 preferably has a perforation in its bottom that is slightly less in diameter than the diameter of the coin intended to be used, so that in case a false coin or one which is smaller in diameter than the size of the coin intended to be used is deposited in the pan it will drop through the bottom and will not weigh down the lever 5. This pan 4 is secured to a rod 171, which is pivoted to turn upon the starting-lever 5 and is normally maintained in the position illustrated in Fig. 3 by a coiled spring 172. This rod 171 is provided at its rear end with a right-angle extension 173, which projects into the path of the pins 53, Fig. 8, on the main drum, or other suitable pins may be provided therefor. By this arrangement it will be seen that when the main drum brings one of the pins in contact with the extension 173 the rod 171 will be turned against the tension of its spring, which will cause the coin-pan 4 to be turned over to discharge any coin which may have been caught therein. When a proper coin has depressed the outer end of the starting-lever 5, the rear end 174 will be elevated and by reason of its connection with the link 135 will cause the lever 133, Fig. 18, to be raised to set the device in operation.

Having described a construction embodying my invention and the operation of the individual parts thereof, I will now briefly describe the operation of the entire device.

We will suppose that the parts are in a state of rest and that the operation of the device is controlled by a coin and that the first disk in the carriage is to be played. The coin is first inserted in the coin-slot in the casing and is conveyed to the coin-tray. The tray end of the starting-lever will thus be depressed and the auxiliary drum started in the manner before described. The auxiliary drum having been released at the line $b$, Fig. 18, will revolve a distance corresponding to the distance between the lines $b$ $c$, when the auxiliary drum will be stopped and the main drum started in the manner which has been described. This movement of the auxiliary drum from the lines $b$ to $c$, which I term the "first" movement, first causes the cam 60 to move the upper end of the arm 91 outward, thereby rotating the gear 87 the distance between two teeth by means of the pawl 93. When these parts have been brought to the end of their movement, the nose 90 is forced between the teeth of the gear 85, thereby locking the parts against further movement. The movement which was given to the gear 87 was transmitted to the gear 85, from the gear 85 to the gear 84, and to the heart-shaped cam 82, which moved the lever 78, by which the carriage was shifted to bring the first note-disk in the carriage to a position where it can be conveyed to the operative position in the instrument. The movement given to the gear 87 caused the pointer 95, which is connected therewith and which is carried at the outside of the casing, to be moved to the numeral "1" on the dial 96, thereby indicating that the first tune is to be played, and reference to an index, which is preferably carried by the casing, but has not been shown, will disclose the name of the tune. After the note-disk carriage has been locked against movement in the manner stated the cam 61 will be brought into action to cause the depending arm 116 of the segmental rack 114 to be moved from the position illustrated in Fig. 5 to that illustrated in Fig. 6, which will result in the transporting-arms 101 being raised in the manner which has been heretofore described to convey the first note-disk to operative position. After the note-disk has been raised one of the cams 62 will be brought into contact with the roller 126 to rock the rock-shaft 37, and thereby cause the pivot 13 to be projected through the central hole in the disk, and at the same time the protector-bar 32, Fig. 19, will be moved to the dotted-line position and the presser-bar 14 will be moved inward to clamp the note-disk in position and to cause the rack thereon to be brought into engagement with the driving-wheel 12. The parts will be maintained in this position by the roller 126 being maintained on the highest portion of the cam 62, as indicated in dotted lines in Fig. 6. It will be observed that all of these movements of the parts have been produced while the drum has been traveling the distance between the lines $b$ and $c$ or during what I have termed the "first" movement. When the line $c$ is reached, the movements above described have taken place and the lever 142, Fig. 18, will be at once forced into the depression 167, which will result in the lever 143 being operated to stop the governor 59 and the lever 149 will be simultaneously withdrawn from the path of the governor 49, thereby freeing the main drum, which will rotate the driving-wheel 12 to operate the note-disk. When the note-disk has made a complete revolution, the main drum will have made a half-revolution, thereby bringing the depression 169 to a point where the arm 148 of the lever 147 may be forced therein. The movement thus given to the lever 147 will cause the governor of the main drum to be stopped and the auxiliary drum to be again released. Thus the second movement has been completed and the third movement started. The third movement corresponds to the movement of the auxiliary drum between the lines $c$ and $d$, Fig. 18, which first causes a movement of the cam 62, on the top of which the roller 126 has been resting, thereby releasing the arm 125 and allowing the clamping-bar, note-disk pivot, and protector-bar to simultaneously resume their normal positions. As soon as these parts have been moved in the manner described the cam 61 allows the transporting-fingers 101 to be lowered, together with the note-disk, and the note-disk will in this manner be deposited in its place in the carriage. At the same instant an opening in the cam 60 will be brought opposite to the roller carried by the arm 91, when the roller will be forced into said opening by reason of the connection of the spring 92 with the arm 88. This movement of the arm 91 will cause the locking-nose 90 to be withdrawn from the teeth of the gear 85, when the carriage is free to be moved by the operating-lever 95, so that any desired tune-disk in the carriage may be brought into the path of the transporting-arms 101 instead of having the carriage automatically fed to a position where the next succeeding note-disk will be brought into the path of the arms 101.

Where the instrument is intended to be started by hand, the operation is the same, except that the coin tray and slot are dispensed with and the starting-lever is operated by operating-arm 162 in the manner hereinbefore described. It will be noted in this connection that when the operating-arm 162 is turned to the point "Repeat" the catch 164 will engage the pin 165 and will prevent the stop-lever 149 from stopping the governor of the main drum and will render the lever 157 ineffective to perform its usual function. However, the lower end of the lever 142 will be forced into the depression 167 when it is reached and after the auxiliary drum, which has been released by the pin 165, acting on the lever 133, has moved sufficiently far to bring about the raising of the note-disk and the clamping of it in position. It will thus be seen that when the operating-arm 162 has been moved to the "repeating-point" a disk will be moved up into operative position, will be properly clamped, and the main drum set in operation and that after the note-disk has made a complete revolution it will at once continue to make another without the necessity of conveying the note-disk back to the carriage and again raising it to the operative position.

The present instrument is intended to operate successively twelve (12) different note-disks of a diameter of twenty-seven inches, though obviously the instrument may be arranged for any suitable number of disks. For this reason the gear-wheel 87 has twenty-two teeth and the dial 96 has a corresponding number of numerals or indications arranged successively in a circle, as follows: "1," "2," "3," "4," "5," "6," "7," "8," "9," "10," "11," "12," "11," "10," "9," "8," "7," "6," "5," "4," "3," "2." Thus it will be seen that the operating lever or pointer 95 may be moved successively around the dial from the numerals "1" to "12," thereby moving the heart-shaped cam 82 from the full-line to the dotted-line position in Fig. 5ª, and that from this point the numerals progress in the inverse order to the numeral "1," when the cam 82 is again in the full-line position, so that after the twelve note-disks in the carriage have been played they may be repeated in the inverse order. This same means allows of the placing of any desired tune out of its order. Thus suppose the fourth disk has just been played and it is desired to play the first disk next. It is merely necessary to continue to rotate the pointer in the only direction in which it is capable of being moved until it is over the numeral "12," and when the instrument is started the carriage will be automatically fed one space, thereby bringing the first note-disk into action.

While I have shown and described with considerable exactness one form of automatic musical instrument embodying my invention, I would have it understood that I do not limit myself to the construction shown and described, as I am aware that various modifications in construction and operation may be made without departing from the spirit of my invention.

Having described my invention, what I claim, and desire to secure by Letters Patent, is—

1. The combination of a musical instrument, separate note-sheets for operating the same, means for conveying the note-sheets to and from operative position and a movable guide with which the note-sheets are adapted to contact in their movement to and from the operative position for maintaining the sheets out of contact with the musical instrument while the said sheets are being fed to and from operative position.

2. The combination of a musical instrument, separate note-sheets for operating the same, means for conveying the note-sheets to and from operative position and a guide which partakes of the feed movement of the note-sheet to and from operative position for maintaining the sheets out of contact with the musical instrument while said sheets are being fed to and from operative position.

3. The combination of a musical instrument, separate note-sheets for operating the same, means for conveying the note-sheets to and from operative position, means for clamping a note-sheet in the operative position, and a guide or shield with which the note-sheets are adapted to contact in their movement to and from the operative position, said guide or shield partaking of the lateral movement of a note-sheet when it is being clamped in the operative position by the clamping means, whereby the note-sheets are maintained out of contact with the musical instrument while said sheets are being fed to and from operative position.

4. The combination of a musical instrument, separate note-sheets for operating the same, means for conveying the note-sheets to and from operative position, means for clamping a note-sheet in the operative position and a spring-pressed guide or shield which normally projects beyond the face of the musical instrument and with which the note-sheets are adapted to contact in their movement to and from the operative position, said guide or shield partaking of the lateral movement of a note-sheet when it is being clamped in the operative position by the clamping means, whereby the note-sheets are maintained out of contact with the musical instrument while said sheets are being fed to and from operative position.

5. The combination of a musical instrument, separate note-sheets for operating the same, means for conveying the note-sheets to and from operative position, means for maintaining the sheets out of contact with the musical instrument while said sheets are being fed to and from operative position and mechanism for automatically moving said last-named means independently of the movement of the note-sheets.

6. The combination of a musical instrument, separate note-sheets for operating the same, means for conveying the note-sheets to and from operative position, means for clamping a note-sheet in the operative position, a movable guide or shield which normally maintains the note-sheet out of contact with the musical instrument, but which is moved to allow such contact when the note-sheet-clamping means are operated to clamp the sheet in the operative position, and mechanism for automatically moving said shield or guide independently of the movement of the note-sheets.

7. The combination of a musical instrument, separate note-sheets for operating the same, means for conveying the note-sheets to and from operative position, a movable automatically-operated pivot for the note-sheets and a movable guide or shield which normally maintains the note-sheet out of contact with the musical instrument, but which is automatically moved to allow such contact when the pivot is projected into the operative position.

8. The combination of a musical instrument, separate note-sheets for operating the same, means for conveying the note-sheets to and from operative position, means for clamping the note-sheet in the operative position, a movable automatically-operated pivot for the note-sheets and a movable guide or shield which normally maintains a note-sheet out of contact with the musical instrument, but which is automatically moved to allow such contact when the pivot is projected into the operative position and the note-sheet-clamping means are operated to clamp the note-sheet in the operative position.

9. In a music-box, the combination of a reciprocating note-sheet carriage, gear-wheels for moving said carriage, means for operating said gear-wheels and intermediate mechanism between said gear-wheels and the carriage, whereby the carriage will be reciprocated in opposite directions by a rotation of the gear-wheels.

10. In a music-box, the combination of a reciprocating note-sheet carriage, gear-wheels for moving said carriage, means for automatically operating said gear-wheels and intermediate mechanism between said gear-wheels and the carriage, whereby the carriage will be reciprocated in opposite directions by a rotation of the gear-wheels.

11. In a music-box, the combination of a reciprocating note-sheet carriage, gear-wheels for moving said carriage, hand-operated means for operating said gear-wheels and intermediate mechanism between said gear-wheels and the carriage, whereby the carriage will be reciprocated in opposite directions by a rotation of the gear-wheels.

12. In a music-box, the combination of a reciprocating note-sheet carriage, gear-wheels for moving said carriage, a hand-operated pointer connected to one of said gear-wheels and intermediate mechanism between said gear-wheels and the carriage whereby the carriage will be reciprocated in opposite directions by a rotation of the gear-wheels.

13. In a music-box, the combination of a reciprocating note-sheet carriage, gear-wheels for moving said carriage, a hand-operated pointer connected to one of said gear-wheels, a scale with which said pointer coöperates, means for automatically operating said gear-wheels and intermediate mechanism between said gear-wheels and the carriage whereby the carriage will be reciprocated in opposite directions by a rotation of the gear-wheels.

14. In a music-box, the combination of a note-sheet carriage adapted to support a plurality of note-sheets, gear-wheels for moving said carriage, means for continuously revolving said gear-wheels in one direction, an endless cam operated by said gear-wheels and an operating-lever operatively connected to said carriage and adapted to be operated by said endless cam.

15. In a music-box, the combination of a note-sheet carriage adapted to support a plurality of note-sheets, gear-wheels for moving said carriage, means for automatically and continuously revolving said gear-wheels in one direction, an endless cam operated by said gear-wheels and an operating-lever operatively connected to said carriage and adapted to be operated by said endless cam.

16. In a music-box, the combination of a note-sheet carriage adapted to support a plurality of note-sheets, gear-wheels for moving said carriage, hand-operated means for continuously revolving said gear-wheels in one direction, an endless cam operated by said gear-wheels and an operating-lever operatively connected to said carriage and adapted to be operated by said endless cam.

17. In a music-box, the combination of a note-sheet carriage adapted to support a plurality of note-sheets, gear-wheels for moving said carriage, a hand-operated pointer connected to said gear-wheels to continuously revolve the same in one direction, a scale with which said pointer coöperates, an endless cam operated by said gear-wheels and an operating-lever operatively connected to said carriage and adapted to be operated by said endless cam.

18. The combination of a note-sheet carriage, a gear-wheel for revolving said carriage, means for moving said gear continuously in one direction, said gear-wheel having as many teeth as there are spaces moved by the carriage during a single revolution of the gear.

19. The combination of a note-sheet carriage, a gear-wheel for moving said carriage, means for revolving said gear continuously in one direction, intermediate mechanism between said gear-wheel and the carriage, which mechanism is operatively connected to said parts, said gear-wheel having as many teeth as there are spaces moved by the carriage during a single revolution of the gear.

20. The combination of a reciprocating note-sheet carriage, a gear-wheel adapted to reciprocate said carriage in opposite directions by a rotation of said gear in one direction, means for moving said gear, said gear-wheel having as many teeth as there are spaces moved by the carriage during a single revolution of the gear.

21. The combination of a reciprocating note-sheet carriage, a gear-wheel adapted to reciprocate said carriage in opposite directions by a rotation of said gear in one direction, a hand-operated pointer for rotating said gear, a scale with which said pointer coöperates, said gear-wheel having as many teeth as there are spaces moved by the carriage during a single revolution of the gear.

22. The combination of a note-sheet carriage, a gear-wheel for moving said carriage, means for automatically and intermittently revolving said gear continuously in one direction, said gear-wheel having as many teeth as there are spaces moved by the carriage during a single revolution of the gear.

23. The combination of a reciprocating note-sheet carriage, a gear-wheel adapted to reciprocate said carriage in opposite directions by a rotation of said gear in one direction, means for automatically and intermittently moving said gear, a hand-operated pointer for rotating said gear, a scale with which said pointer coöperates, said gear-wheel having as many teeth as there are spaces moved by the carriage during a single revolution of the gear.

24. In a music-box, the combination of a reciprocating note-sheet carriage adapted to support a plurality of note-sheets, a gear-wheel adapted to be continuously revolved in one direction to move said carriage, the said gear-wheel having as many teeth as there are spaces moved by the carriage during a single revolution of said gear, means for revolving said gear, an endless cam operated by said gear-wheel, and an operating-lever operatively connected to said carriage and adapted to be operated by the endless cam.

25. In a music-box, the combination of a reciprocating note-sheet carriage adapted to support a plurality of note-sheets, a gear-wheel adapted to be continuously revolved in one direction to move said carriage, said gear-wheel having as many teeth as there are spaces moved by the carriage during a single revolution of said gear, means for automatically and intermittently moving said gear, an endless cam operated by said gear-wheel and an operating-lever operatively connected to said carriage and adapted to be operated by the endless cam.

26. In a music-box, the combination of a reciprocating note-sheet carriage adapted to support a plurality of note-sheets, a gear-wheel adapted to be continuously revolved in one direction to move said carriage, said gear-wheel having as many teeth as there are spaces moved by the carriage during a single revolution of said gear, a hand-operated pointer connected to said gear, a scale coöperating with said pointer, an endless cam operated by said gear-wheel and an operating-lever operatively connected to said carriage and adapted to be operated by the endless cam.

27. In a music-box, the combination of a reciprocating note-sheet carriage adapted to support a plurality of note-sheets, a gear-wheel adapted to be continuously revolved in one direction to move said carriage, said gear-wheel having as many teeth as there are spaces moved by the carriage during a single revolution of said gear, means for automatically and intermittently moving said gear, a hand-operated pointer connected to said gear, a scale coöperating with said pointer, an endless cam operated by said gear-wheel and an operating-lever operatively connected to said carriage and adapted to be operated by the endless cam.

28. In a music-box, the combination of a reciprocating note-sheet carriage adapted to support a plurality of note-sheets and adapted to be reciprocated in opposite directions, intermeshing gear-wheels adapted to be revolved in one direction to move said carriage, one of said gear-wheels being a setting-gear and having as many teeth as there are spaces moved by the carriage during a single revolution of said setting-gear, means for automatically and intermittently revolving said setting-gear, a revoluble hand-operated pointer connected to said setting-gear, a scale coöperating with said pointer, an endless cam connected to one of said gear-wheels, and an operating-lever operatively connected to said carriage and adapted to be operated by the endless cam.

29. In a music-box, the combination of a note-sheet carriage, adapted to support a plurality of note-sheets, a gear-wheel adapted to be continuously revolved in one direction to move said carriage, and a vibrating pawl for intermittently rotating said gear-wheel, the teeth on said gear-wheel being spaced apart so as to form peripheral bearing-surfaces between them to allow the pawl to move a portion of its feed-stroke independently of the gear-wheel.

30. In a music-box, the combination of a note-sheet carriage, adapted to support a plurality of note-sheets, a gear-wheel adapted to be continuously revolved in one direction to move said carriage, a vibrating pawl for rotating said gear-wheel and means for automatically vibrating said pawl, there being a space between the bases of adjacent teeth on said gear-wheel so that the pawl is capable of moving a portion of its feed-stroke independently of the gear-wheel.

31. In a music-box, the combination of a note-sheet carriage adapted to support a plurality of note-sheets, a gear-wheel adapted to be continuously revolved in one direction to move said carriage, a pointer connected to said gear-wheel, a scale coöperating with said pointer, a vibrating pawl for intermittently rotating said gear-wheel and means for automatically vibrating said pawl, the teeth on said gear-wheel being spaced apart at their bases, so that the pawl is capable of moving a portion of its feed-stroke independently of the gear-wheel.

32. The combination of a note-sheet carriage, a setting gear-wheel for moving said carriage, a vibrating pawl for intermittently rotating said setting gear-wheel, the teeth on said setting gear-wheel being spaced apart so that the pawl is capable of moving a portion of its stroke independently of the gear-wheel and a second gear-wheel meshing with said setting-gear, two teeth on the said second-named gear being adapted to engage between every two teeth on the setting-gear.

33. The combination of a note-sheet carriage, a gear-wheel adapted to be continuously revolved in one direction to move said carriage, and a vibrating pawl for intermittently rotating said gear-wheel, the said gear-wheel having as many teeth as there are spaces moved by the carriage during a single revolution of said gear, and the said teeth being spaced apart so that the pawl is capable of moving a portion of its feed-stroke independently of the gear-wheel.

34. The combination of a note-sheet carriage, a gear-wheel adapted to be continuously revolved in one direction to move said carriage, a vibrating pawl for intermittently rotating said gear-wheel, and means for automatically vibrating said pawl, the said gear-wheel having as many teeth as there are spaces moved by the carriage during a single revolution of said gear, and said teeth being spaced apart, so that the pawl is capable of moving a portion of its feed-stroke independently of the gear-wheel.

35. The combination of a note-sheet carriage, a gear-wheel adapted to be continuously revolved in one direction to move said carriage, a vibrating pawl for intermittently rotating said gear-wheel, the said gear-wheel having as many teeth as there are spaces moved by the carriage during a single revolution of said gear, and said teeth being spaced apart so that the pawl is capable of moving a portion of its feed-stroke independently of the gear-wheel, and hand-operated means for operating said gear-wheel independently of the vibrating pawl.

36. The combination of a note-sheet carriage, a gear-wheel adapted to be continuously revolved in one direction to move said carriage, a vibrating pawl for intermittently rotating said gear-wheel, the said gear-wheel having as many teeth as there are spaces moved by the carriage during a single revolution of said gear, and the said teeth being spaced apart so that the pawl is capable of moving a portion of its feed-stroke independently of the gear-wheel, a hand-operated pointer connected to and adapted to operate said gear-wheel independently of the vibrating pawl, and a scale coöperating with said pointer.

37. In a music-box, the combination of a note-sheet carriage, a gear-wheel adapted to be continuously revolved in one direction to move said carriage, a vibrating pawl for intermittently rotating said gear-wheel, the said gear-wheel having as many teeth as there are spaces moved by the carriage during a single revolution of said gear, and the said teeth being spaced apart so that the pawl is capable of moving a portion of its feed-stroke independently of the gear-wheel, an endless cam operated by said gear-wheel, and an operating-lever operatively connected to the carriage and adapted to be operated by the endless cam.

38. The combination of a note-sheet carriage, intermeshing gear-wheels adapted to be continuously revolved in one direction to move said carriage, a feeding-pawl coöperating with one of said gears and a locking-nose adapted to be positively moved into engagement with another of said intermeshing gears when the pawl has reached the end of its feed movement.

39. The combination of a note-sheet carriage, intermeshing gear-wheels for moving said carriage, a feeding-pawl carried by a vibrating arm and adapted to coöperate with one of said gears, and a fixed locking-nose carried by said vibrating arm and adapted to be vibrated into engagement with another of said gears when the pawl has reached the end of its feed movement.

40. The combination of a note-sheet carriage, intermeshing gear-wheels for moving said carriage, a feeding-pawl carried by a vibrating arm and adapted to coöperate with one of said gears, which is a setting-gear, hand-operated means for moving said setting-gear independently of the movement imparted thereto by the pawl, and a locking-nose carried by said vibrating arm and adapted to be vibrated into engagement with another of said gears when the pawl has reached the end of its feed movement.

41. The combination of a note-sheet carriage, intermeshing gear-wheels for moving said carriage, a feeding-pawl carried by a vibrating arm and adapted to coöperate with one of said gears which is a setting-gear, a hand-operated pointer for moving said setting-gear independently of the movement imparted thereto by the pawl, a scale coöperating with said pointer, means for automatically vibrating said arm, and a fixed locking-nose carried by said vibrating arm and adapted to be vibrated into engagement with another of said gears when the pawl has reached the end of its feed movement.

42. The combination of a note-sheet carriage, intermeshing gear-wheels for moving said carriage, a vibrating feeding-pawl coöperating with one of said gears which is a setting-gear that has its teeth spaced apart so that the pawl is capable of moving a portion of its feed-stroke independently of the setting-gear, and a locking-nose that is adapted to be vibrated into engagement with another of said gears when the pawl has reached the end of its feed movement.

43. The combination of a note-sheet carriage, intermeshing gear-wheels for moving said carriage, a vibrating feed-pawl coöperating with one of said gears, which is a setting-gear that has its teeth spaced apart so that the pawl is capable of moving a portion of its feed-stroke independently of the setting-gear, hand-operated means for moving said setting-gear independently of the movement imparted thereto by the pawl, and a locking-nose that is adapted to be vibrated into engagement with one of said gears when the pawl has reached the end of its feed movement.

44. The combination of a note-sheet carriage, intermeshing gear-wheels for moving said carriage, a vibrating feeding-pawl coöperating with one of said gears, which is a setting-gear that has its teeth spaced apart so that the pawl is capable of moving a portion of its feed-stroke independently of the setting-gear, a hand-operated pointer for moving said setting-gear independently of the movement imparted thereto by the pawl, a scale coöperating with said pointer and a locking-nose that is adapted to be positively moved into engagement with one of said gears when the pawl has reached the end of its feed movement.

45. The combination of a note-sheet carriage, intermeshing gear-wheels for moving said carriage, a vibrating feeding-pawl carried by a vibrating arm and adapted to coöperate with one of said gears, which is a setting-gear that has its teeth spaced apart so that the pawl is capable of moving a portion of its stroke independently of the setting-gear, a hand-operated pointer for moving said setting-gear independently of the movement imparted thereto by the pawl, a scale coöperating with said pointer, means for automatically vibrating said arm and a fixed locking-nose carried by said vibrating arm and adapted to be vibrated into engagement with one of said gears when the pawl has reached the end of its feed movement.

46. The combination of a note-sheet carriage, intermeshing gear-wheels for moving said carriage, an endless cam operated by said gear-wheels, an operating-lever operatively connected to said carriage and adapted to be operated by the endless cam, a vibrating feeding-pawl coöperating with one of said gears, which is a setting-gear that has its teeth spaced apart so that the pawl is capable of moving a portion of its stroke independently of the setting-gear, and a locking-nose that is adapted to be vibrated into engagement with one of said gears when the pawl has reached the end of its feed movement.

47. The combination of a note-sheet carriage, intermeshing gear-wheels for moving said carriage, an endless cam operated by said gear-wheels, an operating-lever operatively connected to said carriage and adapted to be operated by the endless cam, a vibrating feeding-pawl coöperating with one of said gears, which is a setting-gear that has its teeth spaced apart, so that the pawl is capable of moving a portion of its stroke independently of the setting-gear, hand-operated means for moving said setting-gear independently of the movement imparted thereto by the pawl, and a locking-nose that is adapted to be vibrated into engagement with one of said gears when the pawl has reached the end of its movement.

48. The combination of a note-sheet carriage, intermeshing gear-wheels for moving said carriage, a vibrating feeding-pawl coöperating with one of said gears, which is a setting-gear that has as many teeth as there are spaces moved by the carriage during a single revolution of said gear, the said teeth being spaced apart so that the pawl is capable of moving a portion of its feed-stroke independently of the setting-gear, and a locking-nose that is adapted to be positively moved into engagement with one of said gears when the pawl has reached the end of its feed movement.

49. The combination of a note-sheet carriage, intermeshing gear-wheels for moving said carriage, a vibrating feeding-pawl coöperating with one of said gears, which is a setting-gear that has as many teeth as there are spaces moved by the carriage during a single revolution of said gear, the said teeth being spaced apart so that the pawl is capable of moving a portion of its feed-stroke independently of the setting-gear, hand-operated means for moving said setting-gear independently of the movement imparted thereto by the pawl, and a rigid locking-nose that is adapted to be vibrated into engagement with one of said gears when the pawl has reached the end of its feed movement.

50. The combination of a note-sheet carriage, intermeshing gear-wheels for moving said carriage, a vibrating feeding-pawl coöperating with one of said gears, which is a setting-gear that has as many teeth as there are spaces moved by the carriage during a single revolution of said gear, the said teeth being spaced apart so that the pawl is capable of moving a portion of its feed-stroke independently of the setting-gear, a hand-operated pointer for moving said setting-gear independently of the movement imparted thereto by the pawl, a scale coöperating with said pointer, and a locking-nose that is adapted to be vibrated into engagement with one of said gears when the pawl has reached the end of its feed movement.

51. The combination of a note-sheet carriage, comprising side bars carrying rollers, cross-bars adjustably and removably connected to said side bars, spacing-rods which are carried by bars that are removably connected to and adjustably supported upon said crossbars, tracks upon which said carriage is supported, means for preventing the carriage from being displaced from the tracks and means for moving the carriage.

52. In a musical instrument, the combination of a main motor, an auxiliary motor, intermediate controlling mechanism between the said main and auxiliary motors, which intermediate mechanism is operated by the movement of the motors themselves to throw either of said motors into operation when the other is thrown out of operation, and means for rendering the parts of the intermediate mechanism ineffective to release the auxiliary motor.

53. In a musical instrument, the combination of a main motor, an auxiliary motor, intermediate controlling mechanism between the said main and auxiliary motors, which intermediate mechanism is operated by the movement of the motors themselves to throw either of said motors into operation when the other is thrown out of operation, and hand-operated means for rendering the parts of the intermediate mechanism ineffective to release the auxiliary motor.

54. In a musical instrument, the combination of a main motor, an auxiliary motor, intermediate controlling mechanism between the said main and auxiliary motors, which intermediate mechanism is operated by the movement of the motors themselves to throw either of said motors into operation when the other is thrown out of operation, controlling means for rendering the parts of the intermediate mechanism ineffective to release the auxiliary motor, a hand operating-arm operatively connected to said controlling means and a scale coöperating with said operating-arm.

55. In a musical instrument, the combination of a main motor, an auxiliary motor, intermediate controlling mechanism between the said main and auxiliary motors, which intermediate mechanism is operated by the movement of the motors themselves to throw either of said motors into operation when the other is thrown out of operation, controlling means for rendering the parts of the intermediate mechanism ineffective to release the auxiliary motor, and means for releasing the auxiliary drum to give an initial movement thereto when the controlling means are operated.

56. In a musical instrument, the combination of a main motor, an auxiliary motor, intermediate controlling mechanism between the said main and auxiliary motors, which intermediate mechanism is operated by the movement of the motors themselves to throw either of said motors into operation when the other is thrown out of operation, controlling means for rendering the parts of the intermediate mechanism ineffective to release the auxiliary motor, and means connected to the said controlling means for simultaneously releasing the auxiliary drum to give an initial movement thereto when the controlling means are operated to render the intermediate mechanism ineffective.

57. In a musical instrument, the combination of a main motor, an auxiliary motor, intermediate controlling mechanism between the said main and auxiliary motors, which intermediate mechanism is operated by the movement of the motors themselves to throw either of said motors into operation when the other is thrown out of operation, a hand-operated rock-shaft and a catch adapted to be operated by said rock-shaft to engage the controlling-levers of said intermediate mechanism and to prevent them from being operated to release the auxiliary drum.

58. In a musical instrument, the combination of a main driving-motor, an auxiliary driving-motor, intermediate controlling mechanism between the said main and auxiliary driving-motors, which intermediate mechanism is operated by the movement of the motors themselves to throw either of said motors into operation when the other is thrown out of operation, a hand-operated rock-shaft, a catch adapted to be operated by said rockshaft to engage the controlling-levers of said intermediate mechanism and to prevent them from being operated to release the auxiliary drum, a starting-lever which is adapted to operate independently of the intermediate mechanism, and means for operating said starting-lever when the rock-shaft is moved, to give an initial movement to the auxiliary drum.

59. The combination of a main motor, an auxiliary motor, intermediate mechanism between said main and auxiliary motors, which intermediate mechanism comprises a controlling-lever having an arm which is adapted to project into the path of a pin or abutment on the main motor and a second arm which is adapted to project into the path of a pin or abutment on the auxiliary motor, a stop-lever for the main motor, a stop-lever for the auxiliary motor, and means connected to the controlling-lever for throwing one of the stop-levers into operation and the other out of operation when the controlling-lever is shifted.

60. The combination of a main motor, an auxiliary motor, intermediate mechanism between said main and auxiliary motors, which intermediate mechanism comprises a controlling-lever having an arm which is adapted to project into the path of a pin or abutment on the main motor, and a second arm which is adapted to project into the path of a pin or abutment on the auxiliary motor, a stop-lever for the main motor, a stop-lever for the auxiliary motor, means connected to the controlling-lever for throwing one of the stop-levers into operation and the other out of operation when the controlling-lever is shifted, and hand-controlled means for preventing the stop-levers from being moved when the controlling-lever is shifted.

61. The combination of a main motor, an auxiliary motor, intermediate mechanism between said main and auxiliary motors, which intermediate mechanism comprises a controlling-lever having an arm which is adapted to project into the path of a pin or abutment on the main motor, and a second arm which is adapted to project into the path of a pin or abutment on the auxiliary motor, a stop-lever for the main motor, a stop-lever for the auxiliary motor, means connected to the controlling-lever for throwing one of the stop-levers into operation and the other out of operation when either arm of the controlling-lever is operated upon to cause the said lever to be shifted, hand-controlled means for preventing the stop-levers from being moved when the controlling-lever is shifted and means for permitting the controlling-lever to be shifted without transmitting movement to said stop-levers.

62. The combination of a sound-producing device, separate note-sheets for operating the same, means for conveying the note-sheets to and from operative position, and means under control of the operator for maintaining a note-sheet in the operative position during one or more continuous revolutions of the note-sheet as desired.

63. The combination of a sound-producing device, separate note-sheets for operating the same, means for conveying the note-sheets to and from operative position, and hand-operated means for causing a note-sheet to make one or more continuous revolutions as desired.

64. The combination of a sound-producing device, separate note-sheets for operating the same, means for conveying the note-sheets to and from operative position and hand-operated means for controlling the movement of a note-sheet from operative position, whereby the sheet may be caused to make one or more revolutions before being conveyed from the operative position.

65. The combination of a sound-producing device, separate note-sheets for operating the same, means for conveying the note-sheets to and from operative position, mechanism for operating the note-sheets, hand-operated starting mechanism for causing the conveying means and the note-sheet-operating mechanism to be set in operation to convey the note-sheet to the operative position and to automatically throw the conveying means out of operation until such time as the hand-operated mechanism is again moved.

66. The combination of a sound-producing device, separate note-sheets for operating the same, means for conveying the note-sheets to and from operative position, mechanism for operating the note-sheets and hand-operated starting mechanism for causing the conveying means and note-sheet-operating mechanism to be set in operation to convey the note-sheet to the operative position and to automatically throw the conveying means out of operation until such time as the hand-operated mechanism is moved back to the initial position when the note-sheet-operating mechanism is automatically stopped and the note-sheet-conveying means are automatically released.

67. In a musical instrument, the combination of a main motor, an auxiliary motor, intermediate controlling mechanism between the said main and auxiliary motors, which intermediate mechanism is operated by the movement of the motors themselves to throw either of said motors into operation when the other is thrown out of operation, and hand-operated means for controlling the action of the intermediate controlling mechanism so far as it relates to automatically releasing the auxiliary motor to convey the note-sheet from the operative position.

GUSTAV A. BRACHHAUSEN.

Witnesses:
CHARLES E. SMITH,
RUDOLPH ABERLÉ.